US011269166B2

(12) United States Patent
Suzuki et al.

(10) Patent No.: US 11,269,166 B2
(45) Date of Patent: Mar. 8, 2022

(54) ZOOM LENS SYSTEM, AND IMAGE CAPTURE DEVICE AND CAMERA SYSTEM INCLUDING THE ZOOM LENS SYSTEM

(71) Applicant: Panasonic Intellectual Property Management Co., Ltd., Osaka (JP)

(72) Inventors: Hiroaki Suzuki, Osaka (JP); Yuka Kudo, Hyogo (JP); Yoshiaki Kurioka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 134 days.

(21) Appl. No.: 16/742,430

(22) Filed: Jan. 14, 2020

(65) Prior Publication Data
US 2020/0233190 A1 Jul. 23, 2020

(30) Foreign Application Priority Data
Jan. 21, 2019 (JP) .............................. JP2019-007447

(51) Int. Cl.
| | | |
|---|---|---|
| *G02B 15/14* | (2006.01) | |
| *G02B 15/20* | (2006.01) | |
| *G02B 7/14* | (2021.01) | |
| *G03B 17/14* | (2021.01) | |

(52) U.S. Cl.
CPC ........... *G02B 15/1451* (2019.08); *G02B 7/14* (2013.01); *G02B 15/145105* (2019.08); *G02B 15/145121* (2019.08); *G02B 15/20* (2013.01); *G03B 17/14* (2013.01)

(58) Field of Classification Search
CPC ........ G02B 15/145105; G02B 15/1451; G02B 15/145121; G02B 15/1461; G02B 15/14; G02B 15/15; G02B 15/155; G02B 15/16; G02B 15/163; G02B 15/167; G02B 15/17; G02B 15/173; G02B 15/12; G02B 7/14; G03B 17/14
USPC ........................................................ 359/764
See application file for complete search history.

(56) References Cited

U.S. PATENT DOCUMENTS

2014/0347525 A1* 11/2014 Obikane ........ G02B 15/145105
 348/240.3
2015/0085165 A1 3/2015 Maruyama et al.

FOREIGN PATENT DOCUMENTS

JP 2015-64492 4/2015

* cited by examiner

*Primary Examiner* — Kristina M Deherrera
(74) *Attorney, Agent, or Firm* — Wenderoth, Lind & Ponack L.L.P.

(57) ABSTRACT

A zoom lens system includes: a first group of lenses having positive power; a second group of lenses having negative power; a third group of lenses having positive power; a fourth group of lenses having negative power; and a fifth group of lenses having power, which are arranged in this order from an object toward an image. While this system is zooming, intervals between these groups change and the fifth group of lenses moves toward the object. This system satisfies $0.12<T35t/TLt<0.25$, where $T35t$ is a distance, measured at telephoto end, from one surface, closest to the image, of the third group of lenses to another surface, closest to the object, of the fifth group of lenses, and $TLt$ is a distance, measured at the telephoto end, from one surface, closest to the object, of the first group of lenses to an image plane.

20 Claims, 16 Drawing Sheets

(a)

(b)

(c)

(d)

(e)

(f)

(a)

(b)

(c)

(d)

(e)

(f)

ZOOM LENS SYSTEM, AND IMAGE CAPTURE DEVICE AND CAMERA SYSTEM INCLUDING THE ZOOM LENS SYSTEM

CROSS-REFERENCE TO RELATED APPLICATION

This application claims the benefit of foreign priority to Japanese Patent Application No. 2019-007447 filed on Jan. 21, 2019, the mire disclosure of which is hereby incorporated by reference.

TECHNICAL FIELD

The present disclosure relates to a zoom lens system in which various types of aberrations have been compensated for sufficiently over the entire zoom range and which has excellent close-up shooting capability, and also relates to an image capture device and camera system including such a zoom lens system.

BACKGROUND ART

JP 2015-64492 A discloses a zoom lens system including: a first group of lenses with positive refractive power; a second group of lenses with negative refractive power; a third group of lenses with positive refractive power; a fourth group of lenses with negative refractive power; and a fifth group of lenses with negative refractive power, where these first through fifth groups of lenses are arranged in this order such that the first group of lenses is located closer to an object than any other group of lenses and that the fifth group of lenses is located closer to an image than any other group of lenses. This zoom lens system has a maximum aperture of about 4.10 over the entire zoom range.

The present disclosure provides a zoom lens system in which various types of aberrations have been compensated for sufficiently over the entire zoom range and which has excellent close-up shooting capability, and also provides an image capture device and camera system including such a zoom lens system.

SUMMARY

A zoom lens system according to the present disclosure includes: a first group of lenses having positive power; a second group of lenses having negative power; a third group of lenses having positive power; a fourth group of lenses having negative power; and a fifth group of lenses having power. The first, second, third, fourth, and fifth groups of lenses are arranged in this order such that the first group of lenses is located closer to an object than any other group of lenses and that the fifth group of lenses is located closer to an image than any other group of lenses. While the zoom lens system is zooming, intervals between the respective groups of lenses change and the fifth group of lenses moves toward the object. The zoom lens system satisfies the following Inequality (1):

$$0.12 < T35t/TLt < 0.25 \qquad (1)$$

where $T35t$ is a distance, measured at telephoto end, from one surface, located closest to the image, of the third group of lenses to another surface, located closest to the object, of the fifth group of lenses, and $TLt$ is a distance, measured at the telephoto end, from one surface, located closest to the object, of the first group of lenses to an image plane.

DESCRIPTION OF EMBODIMENTS

Embodiments of the present disclosure will be described in detail with reference to the accompanying drawings. Note that unnecessarily detailed description may be omitted. For example, detailed description of already well-known matters and redundant description of substantially the same configuration may be omitted. This is done to avoid making the following description overly redundant and to help one of ordinary skill in the art understand the present disclosure.

In addition, note that the accompanying drawings and the following description are provided to help one of ordinary skill in the art understand the present disclosure fully and should not be construed as limiting the scope of the present disclosure, which is defined by the appended claims.

First to Third Embodiments

Zoom lens systems according to first to third embodiments will be described on an individual basis with reference to the accompanying drawings.

Note that the zoom lens system according to each of these embodiments includes a first group of lenses G1, a second group of lenses G2, a third group of lenses G3, and a fourth group of lenses G4 and a fifth group of lenses G5 that constitute following groups of lenses.

Figure 1:
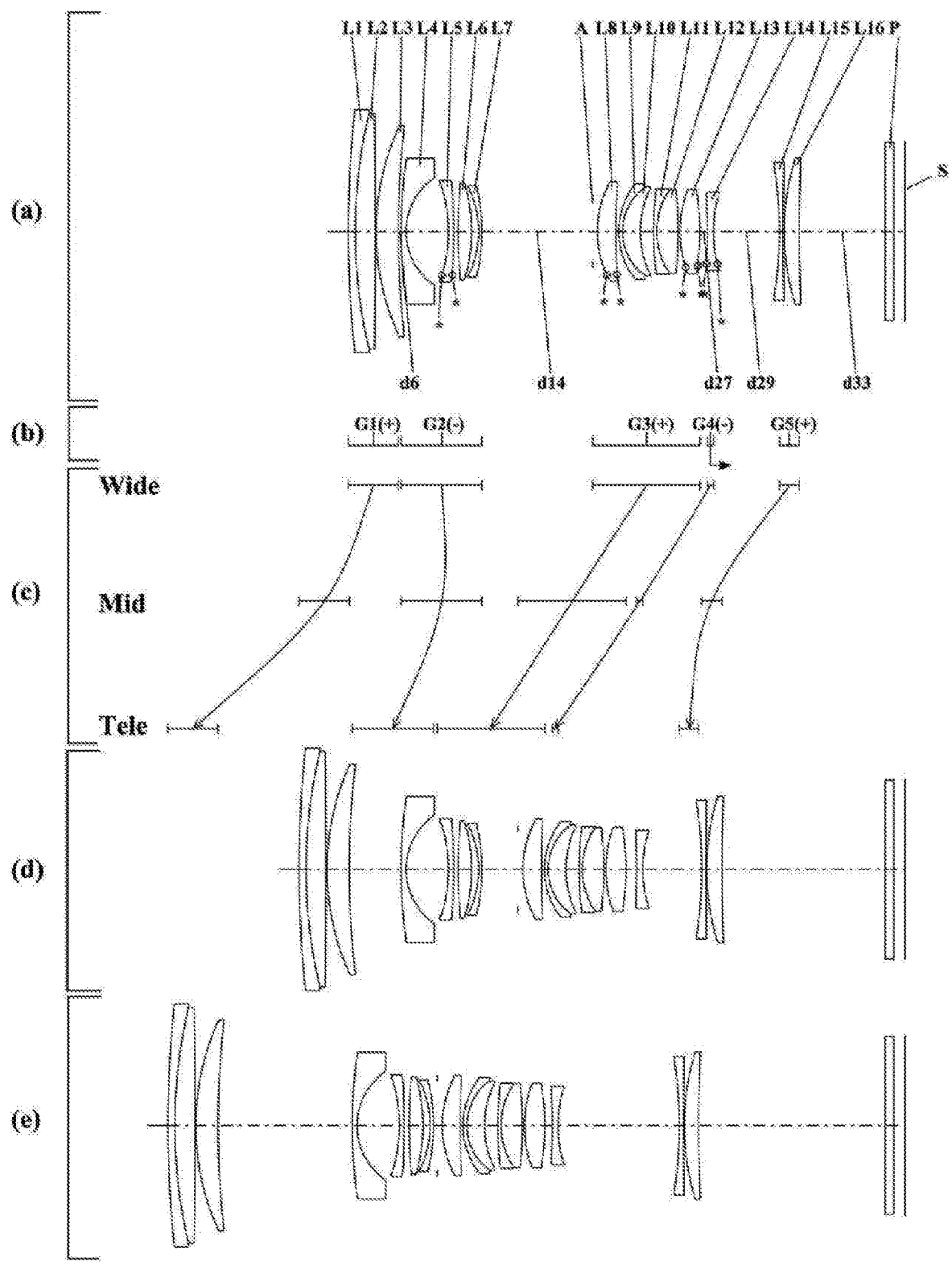
FIG. 1 illustrates lens arrangements showing what state a zoom lens system according to a first embodiment assumes at an infinity focus point.
Figure 4:
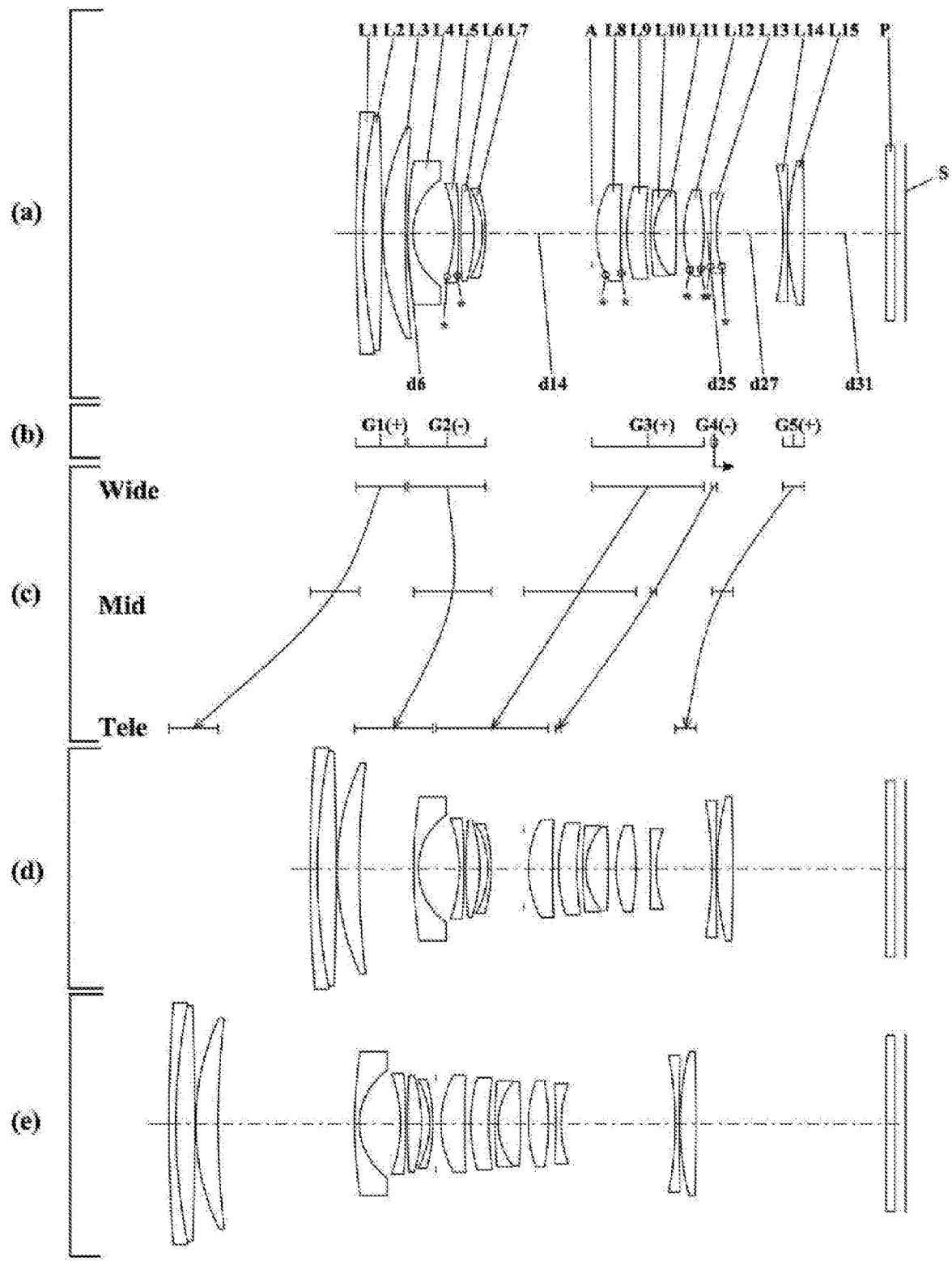
FIG. 4 illustrates lens arrangements showing what state a zoom lens system according to a second embodiment assumes at an infinity focus point.
Figure 7:
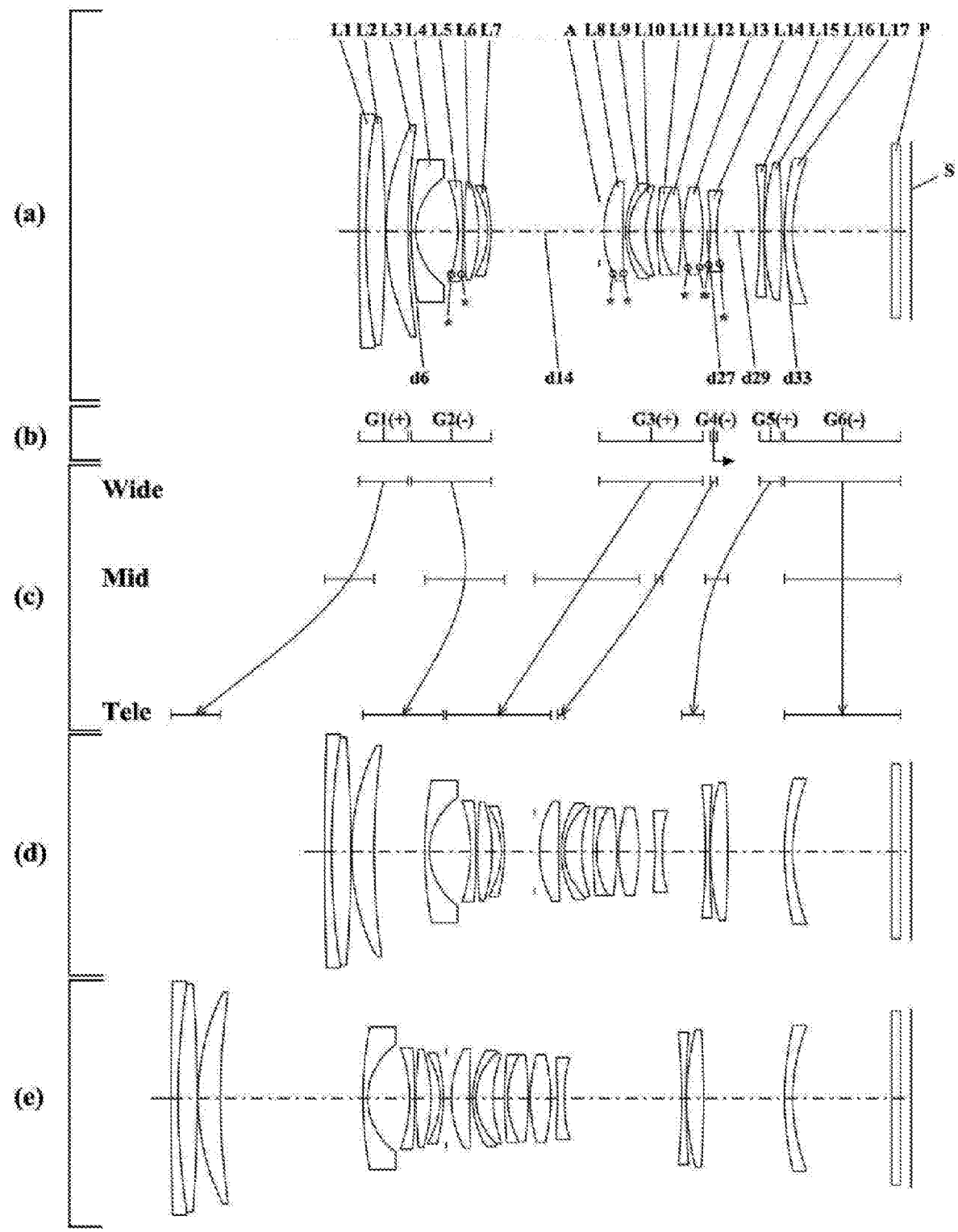
FIG. 7 illustrates lens arrangements showing what state a zoom lens system according to a third embodiment assumes at an infinity focus point.

FIGS. 1, 4, and 7 illustrate lens arrangement diagrams, each showing what state a zoom lens system assumes at an infinity focus point.

In FIGS. 1, 4, and 7, portion (a) illustrates a lens arrangement at the wide-angle end (which is a state with the shortest focal length fW); portion (d) illustrates a lens arrangement at an intermediate position (which is a state with an intermediate focal length fM=√(fW*fT)); and portion (e) illustrates a lens arrangement at the telephoto end (which is a state with the longest focal length fT). Note that portions (a), (d), and (e) of FIGS. 1, 4, and 7 have the same aspect ratio.

Also, in portion (c) of FIGS. 1, 4, and 7, the polygon arrows each connect together the respective positions of the groups of lenses at the wide-angle end (Wide), intermediate position (Mid), and telephoto end (Tele) from top to bottom. Note that these polygon arrows just connect the wide-angle end to the intermediate position and the intermediate position to the telephoto end with the curves, and do not indicate the actual movement of the group of lenses.

Furthermore, in portion (b) of FIGS. 1, 4, and 7, the respective groups of lenses are designated by the reference signs G1-G6 corresponding to their respective positions shown in portion (a).

Furthermore, in portion (a) of FIGS. 1, 4, and 7, the asterisk (*) attached to the surface of a particular lens element indicates that the surface is an aspheric surface.

Furthermore, the signs (+) and (−) added to the reference signs of the respective groups of lenses (G1-G6) in portion (b) of FIGS. 1, 4, and 7 indicate the powers of the respective groups of lenses. That is to say, the positive sign (+) indicates positive power, and the negative sign (−) indicates negative power. Also, the arrow added to the fourth group of lenses G4 in the first to third embodiments indicates, for convenience sake, the direction of movement of the group of lenses G4 while the zoom lens system is focusing from the infinity focus point toward a close focus point. The specific lens elements and group of lenses to move and the direction of their movement will be described later for each of the exemplary embodiments.

Furthermore, in portions (a), (d), and (e) of FIGS. 1, 4, and 7, the straight line drawn at the right end indicates the position of the image plane S (i.e., a surface, facing the object, of the image sensor). Therefore, the left end of the drawings corresponds to the object side. Furthermore, a parallel plate P such as a low-pass filter or cover glass is arranged between the group of lenses on the last stage facing the image plane S and the image plane S.

First Embodiment

A zoom lens system according to a first exemplary embodiment will be described with reference to FIG. 1.

FIG. 1 illustrates a lens arrangement diagram of a zoom lens system according to the first exemplary embodiment and its operation.

As shown in FIG. 1, the zoom lens system according to this embodiment includes: a first group of lenses G1 with positive power; a second group of lenses G2 with negative power; an aperture stop A; a third group of lenses G3 with positive power; a fourth group of lenses G4 with negative power; a fifth group of lenses G5 with positive power; and a parallel plate P, which are arranged in this order such that the first group of lenses G1 is located closer to the object than any other member of this zoom lens system and that the parallel plate P is located closer to the image than any other member of this zoom lens system.

The first group of lenses G1 is constituted of: a first lens element L1 with negative power; a second lens element L2 with positive power; and a third lens element L3 with positive power, which are arranged in this order such that the first lens element L1 is located closer to the object than any other member of this first group of lenses G1 and that the third lens element L3 is located closer to the image than any other member of this first group of lenses G1. The first lens element L1 and the second lens element L2 together form a bonded lens when bonded together with an adhesive such as an ultraviolet-curable resin, for example.

The second group of lenses G2 is constituted of: a fourth lens element L4 with negative power; a fifth lens element L5 with negative power; a sixth lens element L6 with positive power; and a seventh lens element L7 with negative power, which are arranged in this order such that the fourth lens element L4 is located closer to the object than any other member of this second group of lenses G2 and that the seventh lens element L7 is located closer to the image than any other member of this second group of lenses G2.

The third group of lenses G3 is constituted of: an eighth lens element L8 with positive power; a ninth lens element L9 with negative power; a tenth lens element L10 with positive power; an eleventh lens element L11 with negative power; a twelfth lens element L12 with positive power; and a thirteenth lens element L13 with positive power, which are arranged in this order such that the eighth lens element L8 is located closer to the object than any other member of this third group of lenses G3 and that the thirteenth lens element L13 is located closer to the image than any other member of this third group of lenses G3. The ninth lens element L9 and the tenth lens element L10 together form a bonded lens when bonded together with an adhesive such as an ultraviolet-curable resin, for example. The eleventh lens element L11 and the twelfth lens element L12 together form a bonded lens when bonded together with an adhesive such as an ultraviolet-curable resin, for example.

The fourth group of lenses G4 is constituted of a fourteenth lens element L14 with negative power.

The fifth group of lenses G5 is constituted of a fifteenth lens element L15 with negative power and a sixteenth lens element L16 with positive power. Note that the fifteenth lens element L15 may be implemented as a lens element LGSF, for example.

The aperture stop A is arranged between the seventh lens element L7 of the second group of lenses G2 and the eighth lens element L8 of the third group of lenses G3.

Next, the lens elements that form the respective groups of lenses in the zoom lens system according to this embodiment will be described.

First of all, the respective lens elements that form the first group of lenses G1 will be described.

The first lens element L1 is a meniscus lens with a convex surface facing the object. The second lens element L2 is a biconvex lens. The third lens element L3 is a meniscus lens with a convex surface facing the object.

Next, the respective lens elements that form the second group of lenses G2 will be described.

The fourth lens element L4 is a meniscus lens with a convex surface facing the object. The fifth lens element L5 is a meniscus lens with a convex surface facing the image. Both surfaces of the fifth lens element L5 are aspheric surfaces. The sixth lens element L6 is a biconvex lens. The seventh lens element L7 is a meniscus lens with a convex surface facing the image.

Next, the respective lens elements that form the third group of lenses G3 will be described.

The eighth lens element L8 is a meniscus lens with a convex surface facing the object. Both surfaces of the eighth lens element L8 are aspheric surfaces. The ninth lens element L9 is a meniscus lens with a convex surface facing the object. The tenth lens element L10 is a meniscus lens with a convex surface facing the object. The eleventh lens element L11 is a meniscus lens with a convex surface facing the object. The twelfth lens element L12 is a biconvex lens. The thirteenth lens element L13 is a biconvex lens. Both surfaces of the thirteenth lens element L13 are aspheric surfaces.

Next, the lens element that forms the fourth group of lenses G4 will be described.

The fourteenth lens element L14 is a biconcave lens. Both surfaces of the fourteenth lens element L14 are aspheric surfaces.

Next, the respective lens elements that form the fifth group of lenses G5 will be described.

The fifteenth lens element L15 is a meniscus lens with a convex surface facing the image. The sixteenth lens element L16 is a biconvex lens.

As can be seen, the zoom lens system according to this embodiment is constituted of these five groups of lenses.

The respective groups of lenses that form the zoom lens system according to this embodiment move as indicated by the arrows in portion (c) of FIG. 1 while the zoom lens system is zooming from the wide-angle end (Wide) toward the telephoto end (Tele) during a shooting session.

Specifically, the first group of lenses G1 moves toward the object. The second group of lenses G2 moves so as to draw a locus that is convex toward the image plane S. The aperture stop A and the third group of lenses G3 together move toward the object. The fourth group of lenses G4 moves toward the object. The fifth group of lenses G5 also moves toward the object. These movements increase the interval between the first group of lenses G1 and the second group of lenses G2 and decrease the interval between the second group of lenses G2 and the third group of lenses G3 as the zoom lens system is zooming. The interval between the third group of lenses G3 and the fourth group of lenses G4 increases in the range from the wide-angle end through the intermediate position but decreases in the range from the intermediate position through the telephoto end. The interval between the fourth group of lenses G4 and the fifth group of lenses G5 decreases in the range from the wide-angle end through the intermediate position but increases in the range from the intermediate position through the telephoto end. The interval between the fifth group of lenses G5 and the image plane S increases. At this time, while the zoom lens system is zooming from the wide-angle end toward the telephoto end, the aperture diameter of the aperture stop A increases in the range from the wide-angle end through the telephoto end.

As can be seen, the respective groups of lenses move along the optical axis L as indicated by the arrows in portion (c) of FIG. 1. As a result, as shown in portions (a), (d), and (e) of FIG. 1, the respective groups of lenses are arranged at the wide-angle end, the intermediate position, and the telephoto end.

That is to say, in the zoom lens system according to this embodiment, every group of lenses moves relatively along the optical axis L. In other words, the intervals between the respective groups of lenses change. This allows a zooming operation to be performed from the wide-angle end through the telephoto end.

Note that the fourth group of lenses G4 that constitutes a group of focus lenses moves toward the image along the optical axis L as indicated by the arrow in portion (b) of FIG. 1 while the zoom lens system is focusing from the infinity focus point toward a close focus point.

Meanwhile, the thirteenth lens element L13 of the third group of lenses G3 moves perpendicularly to the optical axis L, thus optically compensating for an image blur. Specifically, the movement of the thirteenth lens element L13 perpendicular to the optical axis L compensates for the shift of the image point due to vibration of the entire zoom lens system. This allows an image blur caused by a camera shake or vibrations to be compensated for optically.

Second Embodiment

A zoom lens system according to a second exemplary embodiment will be described with reference to FIG. 4.

FIG. 4 illustrates a lens arrangement diagram of a zoom lens system according to the second exemplary embodiment and its operation.

As shown in FIG. 4, the zoom lens system according to this embodiment includes: a first group of lenses G1 with positive power; a second group of lenses G2 with negative power; an aperture stop A; a third group of lenses G3 with positive power; a fourth group of lenses G4 with negative power; a fifth group of lenses G5 with positive power; and a parallel plate P, which are arranged in this order such that the first group of lenses G1 is located closer to the object than any other member of this zoom lens system and that the parallel plate P is located closer to the image than any other member of this zoom lens system.

The first group of lenses G1 is constituted of: a first lens element L1 with negative power; a second lens element L2 with positive power; and a third lens element L3 with positive power, which are arranged in this order such that the first lens element L1 is located closer to the object than any other member of this first group of lenses G1 and that the third lens element L3 is located closer to the image than any other member of this first group of lenses G1. The first lens element L1 and the second lens element L2 together form a bonded lens when bonded together with an adhesive such as an ultraviolet-curable resin, for example.

The second group of lenses G2 is constituted of: a fourth lens element L4 with negative power; a fifth lens element L5 with negative power; a sixth lens element L6 with positive power; and a seventh lens element L7 with negative power, which are arranged in this order such that the fourth lens element L4 is located closer to the object than any other member of this second group of lenses G2 and that the seventh lens element L7 is located closer to the image than any other member of this second group of lenses G2.

The third group of lenses G3 is constituted of: an eighth lens element L8 with positive power; a ninth lens element L9 with positive power; a tenth lens element L10 with negative power; an eleventh lens element L11 with positive power; and a twelfth lens element L12 with positive power, which are arranged in this order such that the eighth lens element L8 is located closer to the object than any other member of this third group of lenses G3 and that the twelfth lens element L12 is located closer to the image than any other member of this third group of lenses G3. The tenth lens element L10 and the eleventh lens element L11 together form a bonded lens when bonded together with an adhesive such as an ultraviolet-curable resin, for example.

The fourth group of lenses G4 is constituted of a thirteenth lens element L13 with negative power.

The fifth group of lenses G5 is constituted of a fourteenth lens element L14 with negative power and a fifteenth lens element L15 with positive power. Note that the fourteenth lens element L14 may be implemented as a lens element LGSF, for example.

The aperture stop A is arranged between the seventh lens element L7 of the second group of lenses G2 and the eighth lens element L8 of the third group of lenses G3.

Next, the lens elements that form the respective groups of lenses in the zoom lens system according to this embodiment will be described.

First of all, the respective lens elements that form the first group of lenses G1 will be described.

The first lens element L1 is a meniscus lens with a convex surface facing the object. The second lens element L2 is a biconvex lens. The third lens element L3 is a meniscus lens with a convex surface facing the object.

Next, the respective lens elements that form the second group of lenses G2 will be described.

The fourth lens element L4 is a meniscus lens with a convex surface facing the object. The fifth lens element L5 is a meniscus lens with a convex surface facing the image. Both surfaces of the fifth lens element L5 are aspheric surfaces. The sixth lens element L6 is a biconvex lens. The seventh lens element L7 is a meniscus lens with a convex surface facing the image.

Next, the respective lens elements that form the third group of lenses G3 will be described.

The eighth lens element L8 is a meniscus lens with a convex surface facing the object. Both surfaces of the eighth lens element L8 are aspheric surfaces. The ninth lens element L9 is a meniscus lens with a convex surface facing the object. The tenth lens element L10 is a meniscus lens with a convex surface facing the object. The eleventh lens element L11 is a biconvex lens. The twelfth lens element L12 is a biconvex lens. Both surfaces of the twelfth lens element L12 are aspheric surfaces.

Next, the lens element that forms the fourth group of lenses G4 will be described.

The thirteenth lens element L13 is a biconcave lens. Both surfaces of the thirteenth lens element L13 are aspheric surfaces.

Next, the respective lens elements that form the fifth group of lenses G5 will be described.

The fourteenth lens element L14 is a meniscus lens with a convex surface facing the image. The fifteenth lens element L15 is a biconvex lens.

As can be seen, the zoom lens system according to this embodiment is constituted of these five groups of lenses.

The respective groups of lenses that form the zoom lens system according to this embodiment move as indicated by the arrows in portion (c) of FIG. 4 while the zoom lens system is zooming from the wide-angle end toward the telephoto end during a shooting session.

Specifically, the first group of lenses G1 moves toward the object. The second group of lenses G2 moves so as to draw a locus that is convex toward the image plane S. The aperture stop A and the third group of lenses G3 together move toward the object. The fourth group of lenses G4 moves toward the object. The fifth group of lenses G5 also moves toward the object. These movements increase the interval between the first group of lenses G1 and the second group of lenses G2 and decrease the interval between second group of lenses G2 and the third group of lenses G3 as the zoom lens system is zooming. The interval between the third group of lenses G3 and the fourth group of lenses G4 increases in the range from the wide-angle end through the intermediate position but decreases in the range from the intermediate position through the telephoto end. The interval between the fourth group of lenses G4 and the fifth group of lenses G5 decreases in the range from the wide-angle end through the intermediate position but increases in the range from the intermediate position through the telephoto end. The interval between the fifth group of lenses G5 and the image plane S increases. At this time, while the zoom lens system is zooming from the wide-angle end toward the telephoto end, the aperture diameter of the aperture stop A increases in the range from the wide-angle end through the telephoto end.

As can be seen, the respective groups of lenses move along the optical axis L as indicated by the arrows in portion (c) of FIG. 4. As a result, as shown in portions (a), (d), and (e) of FIG. 4, the respective groups of lenses are arranged at the wide-angle end, the intermediate position, and the telephoto end.

That is to say, in the zoom lens system according to this embodiment, every group of lenses moves relatively along the optical axis L. In other words, the intervals between the respective groups of lenses change. This allows a zooming operation to be performed from the wide-angle end through the telephoto end.

Note that the fourth group of lenses G4 that constitutes a group of focus lenses moves toward the image along the optical axis L as indicated by the arrow in portion (b) of FIG. 4 while the zoom lens system is focusing from the infinity focus point toward a close focus point.

Meanwhile, the thirteenth lens element L13 of the third group of lenses G3 moves perpendicularly to the optical axis L, thus optically compensating for an image blur. Specifically, the movement of the thirteenth lens element L13 perpendicular to the optical axis L compensates for the shift of the image point due to vibration of the entire zoom lens system. This allows an image blur caused by a camera shake or vibrations to be compensated for optically.

Third Embodiment

A zoom lens system according to a third exemplary embodiment will be described with reference to FIG. 7.

FIG. 7 illustrates a lens arrangement diagram of a zoom lens system according to the third exemplary embodiment and its operation.

As shown in FIG. 7, the zoom lens system according to this embodiment includes: a first group of lenses G1 with positive power; a second group of lenses G2 with negative power; an aperture stop A; a third group of lenses G3 with positive power; a fourth group of lenses G4 with negative power; a fifth group of lenses G5 with positive power; a sixth group of lenses G6 with negative power; and a parallel plate P, which are arranged in this order such that the first group of lenses G1 is located closer to the object than any other member of this zoom lens system and that the parallel plate P is located closer to the image than any other member of this zoom lens system.

The first group of lenses G1 is constituted of: a first lens element L1 with negative power; a second lens element L2 with positive power; and a third lens element L3 with positive power, which are arranged in this order such that the first lens element L1 is located closer to the object than any other member of this first group of lenses G1 and that the third lens element L3 is located closer to the image than any other member of this first group of lenses G1. The first lens element L1 and the second lens element L2 together form a bonded lens when bonded together with an adhesive such as an ultraviolet-curable resin, for example.

The second group of lenses G2 is constituted of: a fourth lens element L4 with negative power; a fifth lens element L5 with negative power; a sixth lens element L6 with positive power; and a seventh lens element L7 with negative power, which are arranged in this order such that the fourth lens element L4 is located closer to the object than any other member of this second group of lenses G2 and that the seventh lens element L7 is located closer to the image than any other member of this second group of lenses G2.

The third group of lenses G3 is constituted of: an eighth lens element L8 with positive power; a ninth lens element L9 with negative power; a tenth lens element L10 with positive power; an eleventh lens element L11 with negative power; a twelfth lens element L12 with positive power; and a thirteenth lens element L13 with positive power, which are arranged in this order such that the eighth lens element L8 is located closer to the object than any other member of this third group of lenses G3 and that the thirteenth lens element L13 is located closer to the image than any other member of this third group of lenses G3. The ninth lens element L9 and the tenth lens element L10 together form a bonded lens when bonded together with an adhesive such as an ultraviolet-curable resin, for example. The eleventh lens element L11 and the twelfth lens element L12 together form a bonded lens when bonded together with an adhesive such as an ultraviolet-curable resin, for example.

The fourth group of lenses G4 is constituted of a fourteenth lens element L14 with negative power.

The fifth group of lenses G5 is constituted of a fifteenth lens element L15 with negative power and a sixteenth lens element L16 with positive power. Note that the fifteenth lens element L15 may be implemented as a lens element LGSF, for example.

The sixth group of lenses G6 is constituted of a seventeenth lens element L17 with negative power.

The aperture stop A is arranged between the seventh lens element L7 of the second group of lenses G2 and the eighth lens element L8 of the third group of lenses G3.

Next, the lens elements that form the respective groups of lenses in the zoom lens system according to this embodiment will be described.

First of all, the respective lens elements that form the first group of lenses G1 will be described.

The first lens element L1 is a meniscus lens with a convex surface facing the object. The second lens element L2 is a biconvex lens. The third lens element L3 is a meniscus lens with a convex surface facing the object.

Next, the respective lens elements that form the second group of lenses G2 will be described.

The fourth lens element L4 is a meniscus lens with a convex surface facing the object. The fifth lens element L5 is a meniscus lens with a convex surface facing the image. Both surfaces of the fifth lens element L5 are aspheric surfaces. The sixth lens element L6 is a biconvex lens. The seventh lens element L7 is a meniscus lens with a convex surface facing the image.

Next, the respective lens elements that form the third group of lenses G3 will be described.

The eighth lens element L8 is a meniscus lens with a convex surface facing the object. Both surfaces of the eighth lens element L8 are aspheric surfaces. The ninth lens element L9 is a meniscus lens with a convex surface facing the object. The tenth lens element L10 is a meniscus lens with a convex surface facing the object. The eleventh lens element L11 is a meniscus lens with a convex surface facing the object. The twelfth lens element L12 is a biconvex lens. The thirteenth lens element L13 is a biconvex lens. Both surfaces of the thirteenth lens element L13 are aspheric surfaces.

Next, the lens element that forms the fourth group of lenses G4 will be described.

The fourteenth lens element L14 is a biconcave lens. Both surfaces of the fourteenth lens element L14 are aspheric surfaces.

Next, the respective lens elements that form the fifth group of lenses G5 will be described.

The fifteenth lens element L15 is a meniscus lens with a convex surface facing the image. The sixteenth lens element L16 is a biconvex lens.

As can be seen, the zoom lens system according to this embodiment is constituted of these six groups of lenses.

The respective groups of lenses that form the zoom lens system according to this embodiment move as indicated by the arrows in portion (c) of FIG. 7 while the zoom lens system is zooming from the wide-angle end toward the telephoto end during a shooting session.

Specifically, the first group of lenses G1 moves toward the object. The second group of lenses G2 moves so as to draw a locus that is convex toward the image plane S. The aperture stop A and the third group of lenses G3 together move toward the object. The fourth group of lenses G4 moves toward the object. The fifth group of lenses G5 also moves toward the object. The sixth group of lenses G6 does not move. These movements increase the interval between the first group of lenses G1 and the second group of lenses G2 and decrease the interval between second group of lenses G2 and the third group of lenses G3 as the zoom lens system is zooming. The interval between the third group of lenses G3 and the fourth group of lenses G4 increases in the range from the wide-angle end through the intermediate position but decreases in the range from the intermediate position through the telephoto end. The interval between the fourth group of lenses G4 and the fifth group of lenses G5 decreases in the range from the wide-angle end through the intermediate position but increases in the range from the intermediate position through the telephoto end. The interval between the fifth group of lenses G5 and the sixth group of lenses G6 increases. At this time, while the zoom lens system is zooming from the wide-angle end toward the telephoto end, the aperture diameter of the aperture stop A increases in the range from the wide-angle end through the telephoto end.

As can be seen, the respective groups of lenses move along the optical axis L as indicated by the arrows in portion (c) of FIG. 7. As a result, as shown in portions (a), (d), and (e) of FIG. 7, the respective groups of lenses are arranged at the wide-angle end, the intermediate position, and the telephoto end.

That is to say, in the zoom lens system according to this embodiment, every group of lenses moves relatively along the optical axis L. In other words, the intervals between the respective groups of lenses change. This allows a zooming operation to be performed from the wide-angle end through the telephoto end.

Note that the fourth group of lenses G4 that constitutes a group of focus lenses moves toward the image along the optical axis L as indicated by the arrow in portion (b) of FIG. 7 while the zoom lens system is focusing from the infinity focus point toward a close focus point.

Meanwhile, the thirteenth lens element L13 of the third group of lenses G3 moves perpendicularly to the optical axis L, thus optically compensating for an image blur.

(Conditions and Effects)

Next, conditions for implementing the zoom lens systems according to the first, second, and third embodiments will be described.

That is to say, a plurality of possible conditions are defined for the zoom lens system according to each of these three embodiments. In that case, a zoom lens system, of which the configuration satisfies all of these possible conditions, is most advantageous.

Alternatively, a zoom lens system that achieves its expected effects by satisfying the individual conditions to be described below may also be obtained.

For example, the zoom lens systems according to the first, second, and third embodiments each include the first group of lenses with positive power, the second group of lenses with negative power, the third group of lenses with positive power, the fourth group of lenses with negative power, and the fifth group of lenses with power, which are arranged in this order such that the first group of lenses is located closer to the object than any other group of lenses of this zoom lens system and that the fifth group of lenses is located closer to the image than any other group of lenses of this zoom lens system. While the zoom lens system is zooming, the intervals between the respective groups of lenses change and the fifth group of lenses moves toward the object.

The zoom lens system suitably satisfies the condition expressed by the following Inequality (1), for example:

$$0.12 < T35t/TLt < 0.25 \tag{1}$$

where T35t is a distance, measured at the telephoto end, from one surface, located closest to the image, of the third group of lenses G3 to another surface, located closest to the object, of the fifth group of lenses G5, and TLt is a distance, measured at the telephoto end, from one surface, located closest to the object, of the first group of lenses G1 to the image plane S.

That is to say, the condition expressed by Inequality (1) defines the relationship between the interval, measured along the optical axis L, from the third group of lenses G3 to the fifth group of lenses G5 and the total length of the zoom lens system.

If the T35t/TLt ratio is equal to or less than 0.12, which is the lower limit of the condition expressed by Inequality (1), then the stroke of the group of focus lenses becomes too short, thus making it difficult to focus on a close subject. Conversely, if the T35t/TLt ratio is equal to or greater than 0.25, which is the upper limit of the condition expressed by Inequality (1), then the stroke of the group of focus lenses becomes too long, thus causing a decline in focusing speed.

At this time, one of the two conditions expressed by the following Inequalities (1a) and (1b) is more suitably satisfied:

$$0.15 < T35t/TLt \tag{1a}$$

$$T35t/TLt < 0.22 \tag{1b}$$

This enhances the effects described above.

Also, one of the two conditions expressed by the following Inequalities (1c) and (1d) is more suitably satisfied:

$$0.17 < T35t/TLt \tag{1c}$$

$$T35t/TLt < 0.2 \tag{1d}$$

This further enhances the effects described above.

Furthermore, the zoom lens system suitably satisfies the condition expressed by the following Inequality (2):

$$0.05 < T35w/TLw < 0.2 \tag{2}$$

where T35w is a distance, measured at the wide-angle end, from the surface, located closest to the image, of the third group of lenses G3 to the surface, located closest to the object, of the fifth group of lenses G5, and TLw is a distance, measured at the wide-angle end, from the surface, located closest to the object, of the first group of lenses G1 to the image plane.

That is to say, the condition expressed by this Inequality (2) defines the relationship between the interval, measured along the optical axis L, from the third group of lenses G3 to the fifth group of lenses G5 and the total length of the zoom lens system.

If the T35w/TLw ratio is equal to or less than 0.05, which is the lower limit of the condition expressed by Inequality (2), then the stroke of the group of focus lenses becomes too short, thus making it difficult to focus on a close subject and to arrange an actuator for focus driving. Conversely, if the T35w/TLw ratio is equal to or greater than 0.20, which is the upper limit of the condition expressed by Inequality (2), then the stroke of the group of focus lenses becomes too long, thus causing a decline in focusing speed.

At this time, one of the two conditions expressed by the following Inequalities (2a) and (2b) is more suitably satisfied:

$$0.07 < T35w/TLw \tag{2a}$$

$$T35w/TLw < 0.18 \tag{2b}$$

This enhances the effects described above.

Also, one of the two conditions expressed by the following Inequalities (2c) and (2d) is more suitably satisfied:

$$0.09 < T35w/TLw \tag{2c}$$

$$T35w/TLw < 0.2 \tag{2d}$$

This further enhances the effects described above.

Furthermore, the lens element LG5F, located closer to the object than any other one of the lens elements that form the fifth group of lenses G5, suitably has negative power and satisfies the condition expressed by the following Inequality (3):

$$vdLG5F > 65 \quad (3)$$

where vdLG5F is an abbe number of the lens element LG5F.

If the abbe number of the lens element LG5F is equal to or less than 65, which is the lower limit defined by the condition expressed by Inequality (3), then the chromatic aberration of magnification varies significantly while the focus is being shifted. This increases the chromatic aberration of magnification during a close-up shooting session too significantly to ensure good performance.

At this time, the condition expressed by the following Inequality (3a) is more suitably satisfied:

$$vdLG5F > 70 \quad (3a)$$

This enhances the effect described above.

At this time, the condition expressed by the following Inequality (3b) is more suitably satisfied:

$$vdLG5F > 75 \quad (3b)$$

This further enhances the effect described above.

Furthermore, the zoom lens system suitably satisfies the condition expressed by the following Inequality (4), for example:

$$0.3 < |f4|/ft < 0.7 \quad (4)$$

where f4 is a focal length of the fourth group of lenses G4 and ft is a focal length of the entire zoom lens system at the telephoto end.

That is to say, the condition expressed by this Inequality (4) defines the relationship between the focal length of the fourth group of lenses G4 and the focal length of the entire zoom lens system at the telephoto end.

If the |f4|/ft ratio is equal to or less than 0.3, which is the lower limit defined by the condition expressed by this Inequality (4), then the power of the group of focus lenses becomes too low, thus increasing the distance to be traveled by the group of focus lenses from the infinity focus point to the close focus point and causing a decline in focusing speed. Conversely, if the |f4|/ft ratio is equal to or greater than 0.7, which is the upper limit defined by the condition expressed by this Inequality (4), then the power of the group of focus lenses becomes too high, thus causing a significant shift of the image plane as the focus shifts and a significant decline in focus stop accuracy.

At this time, one of the two conditions expressed by the following Inequalities (4a) and (4b) is more suitably satisfied:

$$0.35 < |f4|/ft \quad (4a)$$

$$|f4|/ft < 0.65 \quad (4b)$$

At this time, one of the two conditions expressed by the following Inequalities (4c) and (4d) is more suitably satisfied:

$$0.4 < |f4|/ft \quad (4c)$$

$$|f4|/ft < 0.6 \quad (4d)$$

Furthermore, at least two of the multiple lens elements that form the third group of lenses G3 suitably have an abbe number greater than 65. This allows the axial chromatic aberration to be compensated for sufficiently.

At this time, three or more of the multiple lens elements that form the third group of lenses G3 more suitably have an abbe number greater than 65.

This enhances the effect described above.

Furthermore, the zoom lens system suitably satisfies the condition expressed by the following Inequality (5):

$$0.05 < |dF|/ft < 0.3 \quad (5)$$

where ft is a focal length of the entire zoom lens system at the telephoto end and dF is a distance traveled by a group of focus lenses while focusing from an infinity focus point at the telephoto end to a closest focus point.

That is to say, the condition expressed by this Inequality (5) defines a relationship between the distance traveled by the group of focus lenses while focusing from the infinity focus point at the telephoto end to the closest focus point, and the focal length of the entire zoom lens system at the telephoto end.

If the |dF|/ft ratio is equal to or less than 0.05, which is the lower limit of the condition expressed by this Inequality (5), then the distance traveled by the group of focus lenses is too short, thus causing a decline in focusing accuracy. Conversely, if the |dF|/ft ratio is equal to or greater than 0.3, which is the upper limit of the condition expressed by this Inequality (5), then the distance traveled by the group of focus lenses is too long, thus causing a decline in focusing speed.

At this time, one of the two conditions expressed by the following Inequalities (5a) and (5b) is more suitably satisfied:

$$0.10 < |dF|/ft \quad (5a)$$

$$|dF|/ft < 0.25 \quad (5b)$$

Also, one of the two conditions expressed by the following Inequalities (5c) and (5d) is more suitably satisfied:

$$0.15 < |dF|/ft \quad (5c)$$

$$|dF|/ft < 0.2 \quad (5d)$$

This further enhances the effect described above.

(Schematic Configuration for Image Capture Device to which First Embodiment is Applied)

Next, a schematic configuration for an image capture device, to which the zoom lens system of the first embodiment is applied, will be described with reference to FIG. 10.

Figure 10:
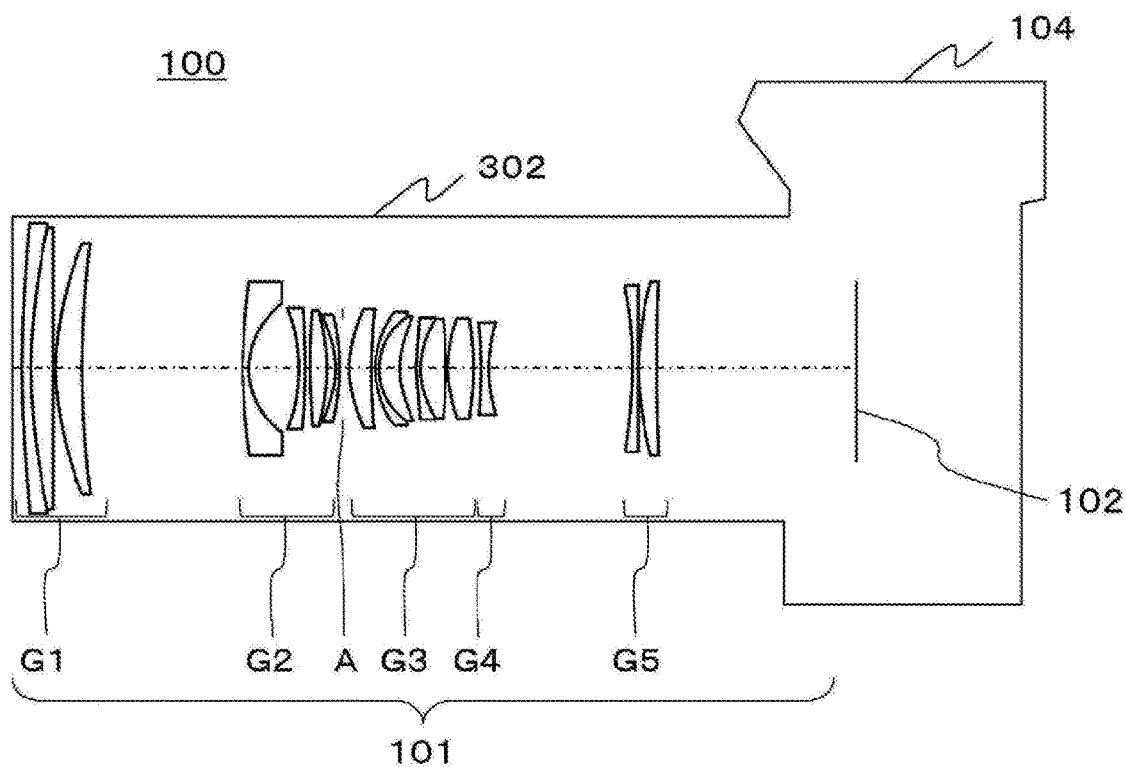
FIG. 10 illustrates a schematic configuration for a camera system including the zoom lens system according to the first embodiment.

FIG. 10 schematically illustrates a configuration for an image capture device including the zoom lens system of the first embodiment described above. In the example illustrated in FIG. 10, the zoom lens system of the first embodiment is applied to an image capture device. However, the same advantage may be achieved even by applying the zoom lens system of the second or third embodiment described above to the image capture device.

As shown in FIG. 10, the image capture device 100 includes a housing 104 and a lens barrel 302 connected to the housing 104. An image sensor 102 is housed in the housing 104. The zoom lens system 101 is housed in the lens barrel 302. The image capture device 100 may be implemented as a digital camera, for example.

The zoom lens system 101 includes the first group of lenses G1, the second group of lenses G2, the third group of lenses G3, the aperture stop A, the fourth group of lenses G4, and the fifth group of lenses G5, all of which are housed in the lens barrel 302.

The lens barrel 302 holds the respective groups of lenses and the aperture stop A that form the zoom lens system 101.

The image sensor 102 is arranged at the image plane S of the zoom lens system according to this embodiment.

In addition, an actuator, a lens frame, and other members are also housed in the housing 104. The respective groups of lenses, the aperture stop A, and other members that form the zoom lens system 101 are attached or fitted to the actuator and the lens frame so as to be movable during the zooming operation.

The image capture device 100 has such a configuration. This provides an image capture device in which various types of aberrations have been compensated for sufficiently.

In the example described above, the zoom lens system is applied to a digital camera. However, this is only an example and should not be construed as limiting. Alternatively, the zoom lens system is also applicable to a different type of image capture device such as a surveillance camera or a smartphone.

(Schematic Configuration for Camera System to which First Embodiment is Applied)

Next, a schematic configuration for a camera system, to which the zoom lens system of the first embodiment is applied, will be described with reference to FIG. 11.

Figure 11:
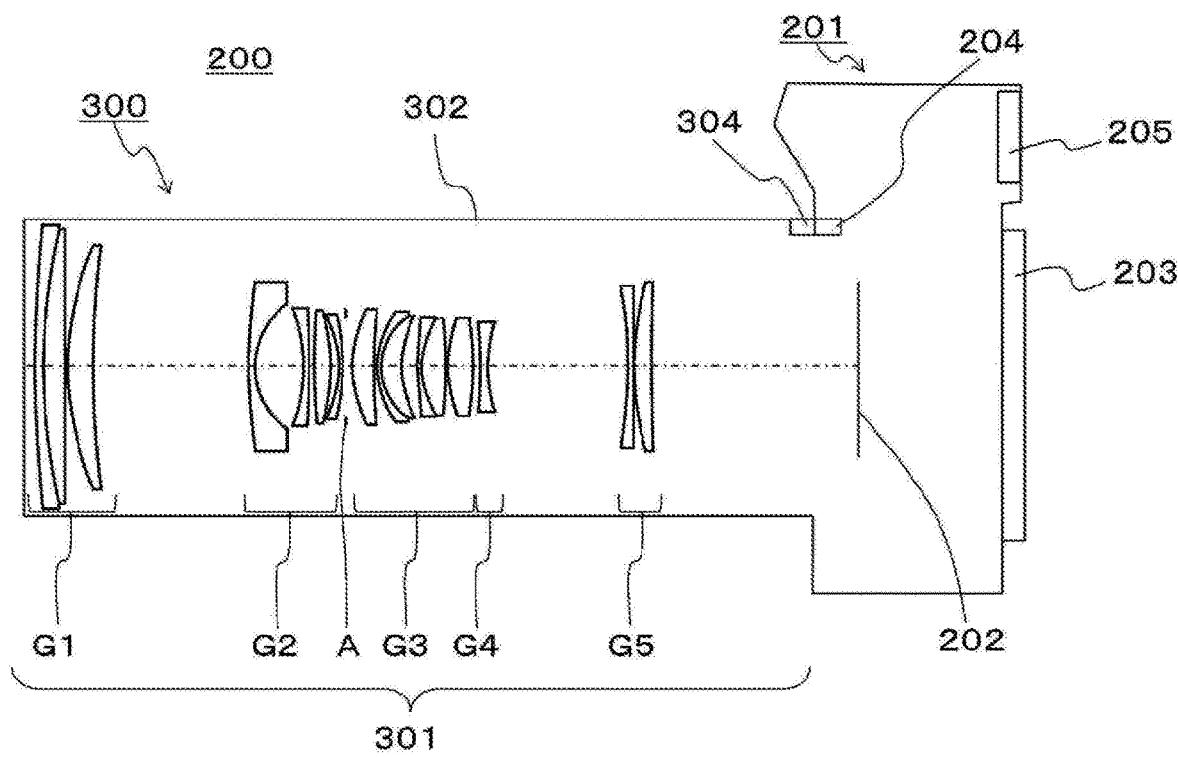
FIG. 11 illustrates a schematic configuration for a lens barrel including the zoom lens system according to the first embodiment.

FIG. 11 schematically illustrates a configuration for a camera system including the zoom lens system of the first embodiment described above. In the example illustrated in FIG. 11, the zoom lens system of the first embodiment is applied to a camera system. However, the same advantage may be achieved even by applying the zoom lens system of the second or third embodiment described above to the camera system. The camera system 200 may be implemented as a digital camera system, of which the lens is interchangeable, for example.

As shown in FIG. 11, the camera system 200 includes a camera body 201 and an interchangeable lens unit 300 to be connected removably to the camera body 201.

The camera body 201 includes an image sensor 202, a monitor 203, a memory (not shown) to store an image signal, a camera mount 204, and a viewfinder 205. The image sensor 202 may be implemented as a CMOS image sensor, for example, and receives an optical image formed by the zoom lens system of the interchangeable lens unit 300 and transforms the optical image into an electrical image signal. The monitor 203 may be implemented as an LCD, for example, and displays the image signal transformed by the image sensor 202.

The interchangeable lens unit 300 includes the zoom lens system 301 including the first group of lenses G1, the second group of lenses G2, the aperture stop A, the third group of lenses G3, the fourth group of lenses G4, and the fifth group of lenses G5.

The lens barrel 302 holds the respective groups of lenses and aperture stop A of the zoom lens system 301. The lens barrel 302 further includes a lens mount 304 to be connected to the camera mount 204 of the camera body 201.

The camera mount 204 of the camera body 201 and the lens mount 304 of the lens barrel 302 are physically connected together with a bayonet mechanism, for example. In addition, a controller (not shown) in the camera body 201 and a controller (not shown) in the interchangeable lens unit 300 are electrically connected together. That is to say, the camera mount 204 and the lens mount 304 serve as interfaces that allow the camera mount 204 and the lens mount 304 to exchange signals with each other.

The zoom lens system 301 includes the respective group of lenses held in the lens barrel 302 of the interchangeable lens unit 300 and the parallel plate P in the camera body 201.

The actuator, the lens frame, and other members to be controlled by the controller are housed in the zoom lens system 301. To the actuator and the lens frame, the respective group of lenses, the aperture stop A, and other members that form the zoom lens system 301 are attached or fitted so as to be movable during the zooming operation.

The camera system 200 may have such a configuration. This provides a camera system 200 in which various types of aberrations have been compensated for sufficiently.

OTHER EMBODIMENTS

The first, second, and third embodiments have been described as exemplary embodiments of the present disclosure.

Note that the embodiments described above are only examples of the present disclosure and should not be construed as limiting. Rather, each of those embodiments may be readily modified, replaced, combined with other embodiments, or partially omitted without departing from the scope of the present disclosure.

For example, in the first to third embodiments described above, the zoom lens system is supposed to be used in the entire zoom range from the wide-angle end through the telephoto end. However, the zoom lens system does not have to be used in the entire zoom range. Alternatively, the zoom lens system may also be used selectively only in an extracted range where optical performance is ensured according to the desired zoom range. That is to say, the zoom lens system may also be used as a zoom lens system with lower zoom power than the zoom lens system to be described for the first, second, and third examples of numerical values corresponding to the first, second, and third embodiments, respectively. Optionally, the zoom lens system may also be used selectively as single-focus lens system only at an extracted focal length where optical performance is ensured according to the desired zoom position.

Also, the zoom lens systems according to the first, second, and third embodiments described above are configured to compensate for an image blur by shifting a lens element for image blur compensation perpendicularly to the optical axis. However, this is only an example and should not be construed as limiting. Alternatively, the image blur may also be compensated for as long as the lens element may be shifted so as to have a component perpendicular to the optical axis. Thus, if the lens barrel may have a complex structure, for example, the zoom lens system may also be configured to compensate for the image blur by pivoting the lens element for image blur compensation around a center on the optical axis.

Furthermore, in the first to third embodiments described above, each of the groups of lenses that form the zoom lens system is supposed to consist of only refractive lens elements that deflect the incoming light ray through refraction (i.e., lens elements of the type that deflects the incoming light ray at the interface between two media with mutually different refractive indices). However, this is only an example and should not be construed as limiting. Alternatively, each group of lenses may also include diffractive lens elements that deflect the incoming light ray through diffraction and/or refractive-diffractive hybrid lens elements that deflect the incoming light ray through a combination of diffraction and refraction actions. Still alternatively, each group of lenses may also be made up of refractive index distributed lens elements that deflect the incoming light ray in accordance with the distribution of refractive indices in the medium. Among other things, a diffraction structure is suitably formed at the interface between two media with mutually different refractive indices in the diffractive-refractive hybrid lens element, because the diffraction efficiency would depend on the wavelength much less heavily in that case. Optionally, an optical aberration such as a chromatic aberration of magnification may also be compensated for by the camera body as well. This provides a camera system in which various types of aberrations have been compensated for sufficiently over the entire zoom range and which has excellent close-up shooting capability.

(Examples of Numerical Values)

Next, exemplary sets of specific numerical values that were actually adopted in the zoom lens systems with the configurations according to the first, second, and third embodiments will be described with reference to FIG. 2, FIGS. 3A-3C, FIG. 5, FIGS. 6A-6C, FIG. 8, and FIGS. 9A-9C.

Note that in the tables showing these exemplary sets of numerical values, the length is expressed in millimeters (mm), the angle of view is expressed in degrees)(°), r indicates the radius of curvature, d indicates the surface interval, nd indicates a refractive index with respect to a d-line, υd (also denoted as "vd") indicates an abbe number with respect to a d-line, and a surface with an asterisk (*) is an aspheric surface. The aspheric shape is defined by the following equation. Furthermore, in the exemplary sets of numerical values, the aperture diameter refers to an effective open aperture diameter (maximum aperture) at each zoom position:

$$Z = \frac{h^2/r}{1+\sqrt{1-(1+\kappa)(h/r)^2}} + \sum A_n h^n$$

where Z is the distance from a point on an aspheric surface, located at a height h measured from the optical axis, to a tangent plane defined with respect to the vertex of the aspheric surface, h is the height as measured from the optical axis, r is the radius of curvature of the vertex, κ is a conic constant, and An is an $n^{th}$ order aspheric surface coefficient.

Figure 2:
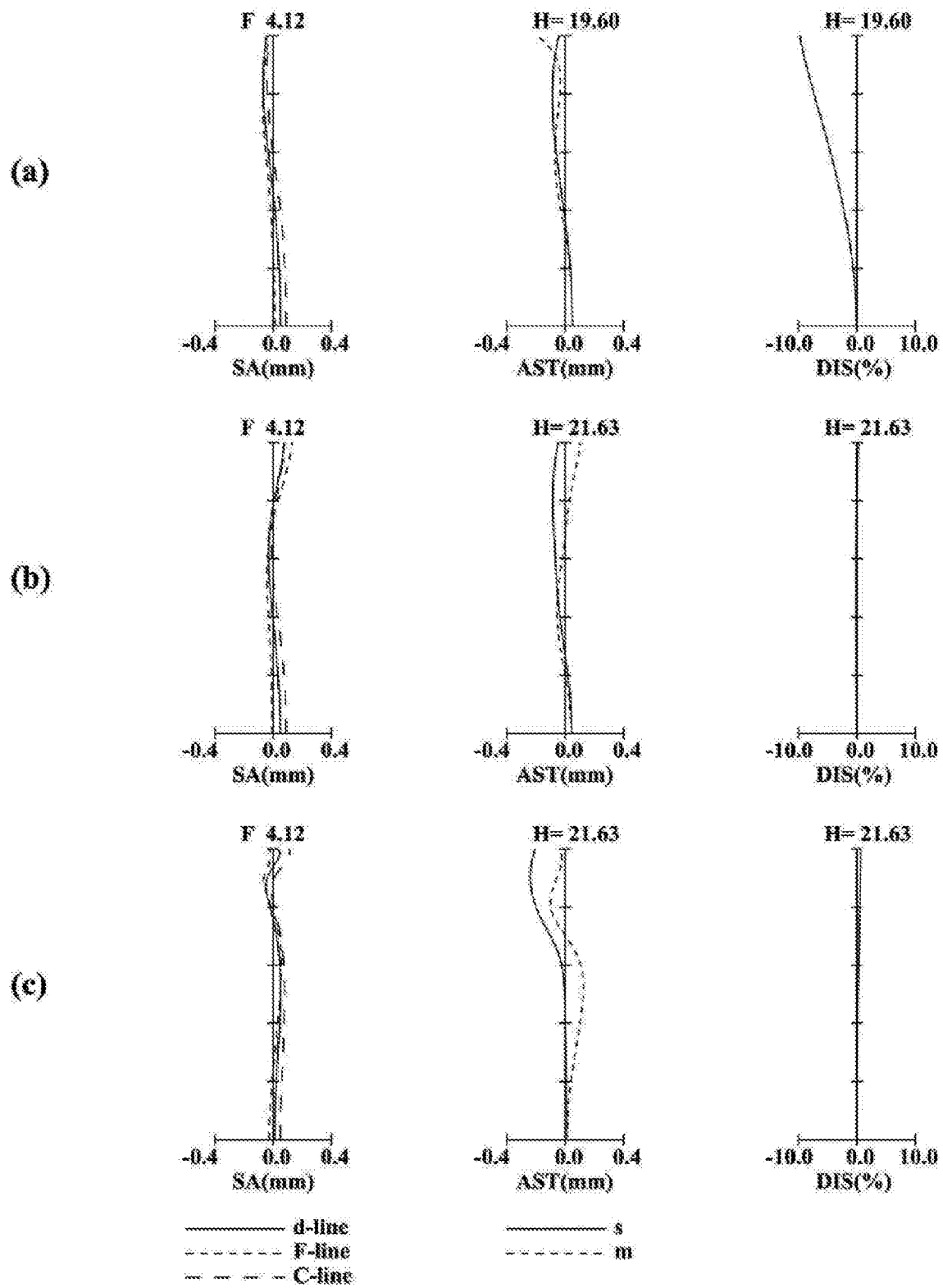
FIG. 2 illustrates longitudinal aberration diagrams showing what state the zoom lens system assumes at the infinity focus point in a first example of numerical values corresponding to the first embodiment.
Figure 5:
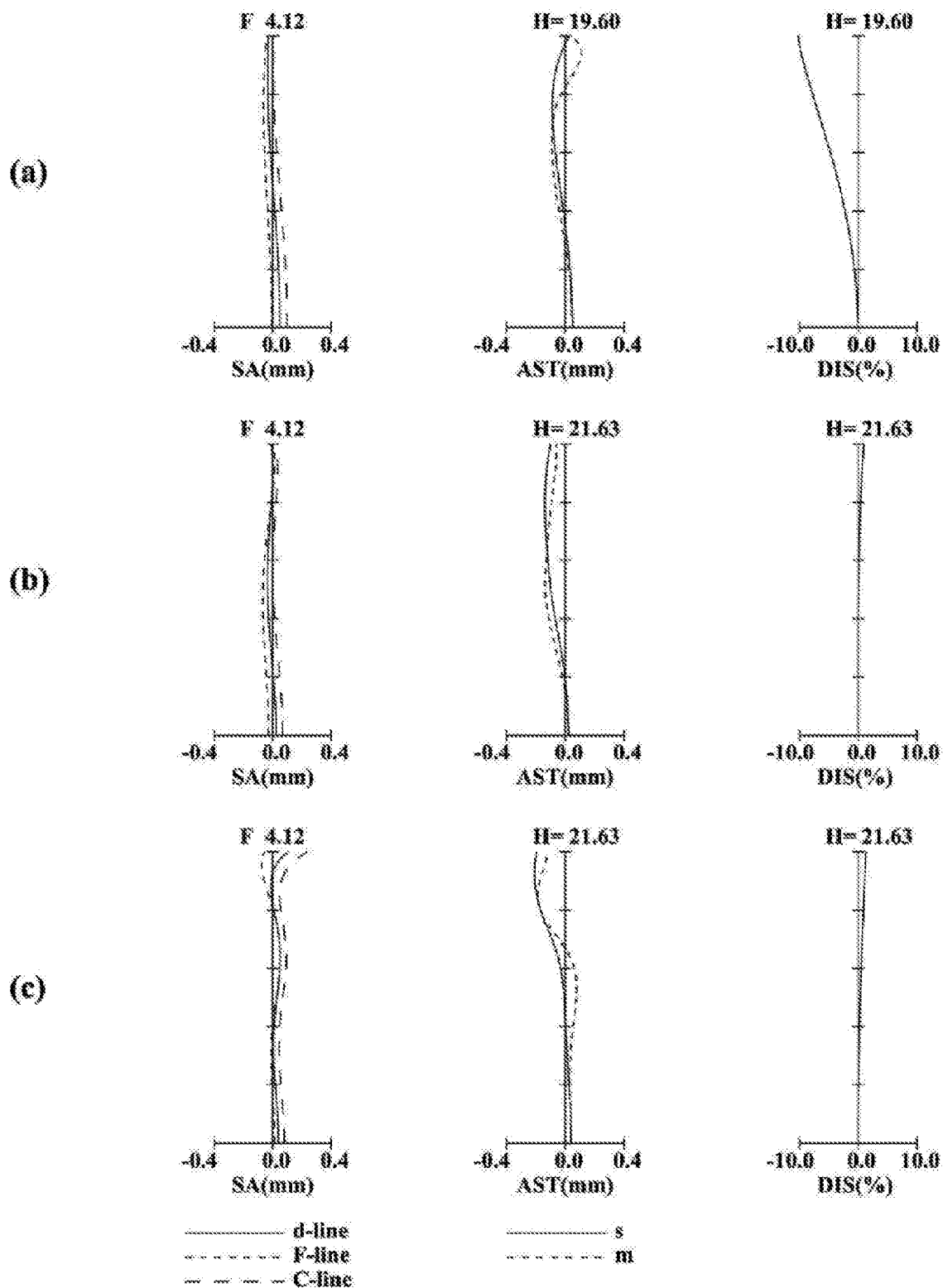
FIG. 5 illustrates longitudinal aberration diagrams showing what state the zoom lens system assumes at the infinity focus point in a second example of numerical values corresponding to the second embodiment.
Figure 8:
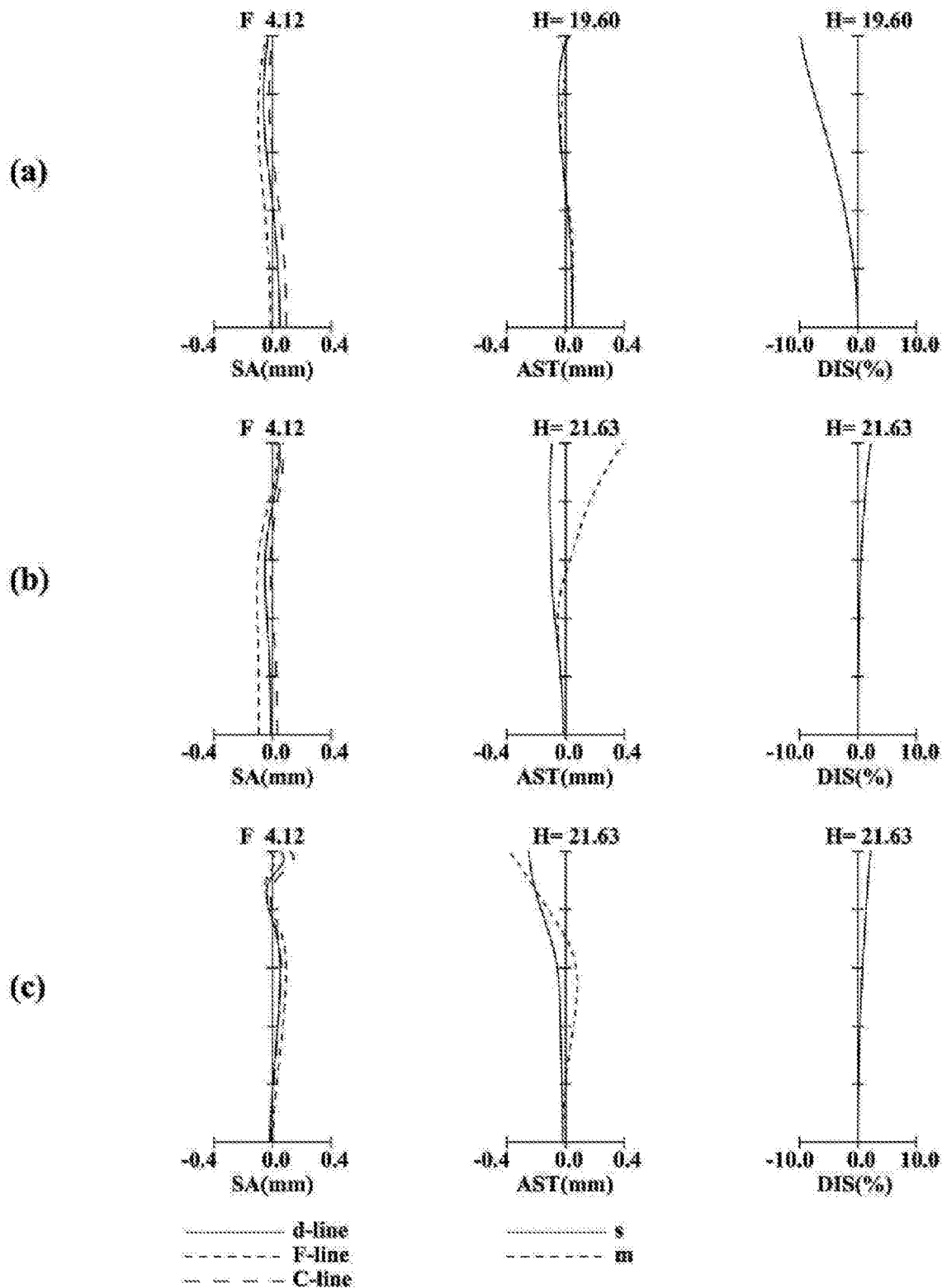
FIG. 8 illustrates longitudinal aberration diagrams showing what state the zoom lens system assumes at the infinity focus point in a third example of numerical values corresponding to the third embodiment.

FIGS. 2, 5, and 8 are longitudinal aberration diagrams showing what state the zoom lens systems according to the first, second, and third examples of numerical values corresponding to the first, second, and third embodiments, respectively, assume at the infinity focus point.

In each longitudinal aberration diagram, portion (a) shows the longitudinal aberrations at the wide-angle end, portion (b) shows the longitudinal aberrations at the intermediate position, and portion (c) shows the longitudinal aberrations at the telephoto end. Each of portions (a), (b) and (c) of these longitudinal aberration diagrams shows spherical aberration (SA (mm)), astigmatism (AST (mm)), and distortion (DIS (%)) in this order from left to right.

In each spherical aberration diagram, the ordinate indicates the F number (designated by "F" on the drawings), the solid curve indicates a characteristic in response to a d-line, the shorter dashed curve indicates a characteristic in response to an F-line, and the longer dashed curve indicates a characteristic in response to a C-line. In each astigmatism diagram, the ordinate indicates the image height (designated by "H" on the drawings), the solid curve indicates a characteristic with respect to a sagittal plane (designated by "s" on the drawings), and the dotted curve indicates a characteristic with respect to a meridional plane (designated by "m" on the drawings). Furthermore, in each distortion diagram, the ordinate indicates the image height (designated by "H" on the drawings).

Figure 3A:
FIG. 3A illustrates lateral aberration diagrams showing a basic state (where the image blur is not compensated for) and image blur compensated states that the zoom lens system according to the example of numerical values assumes at wide-angle end.
Figure 3A:
Figure 3A:
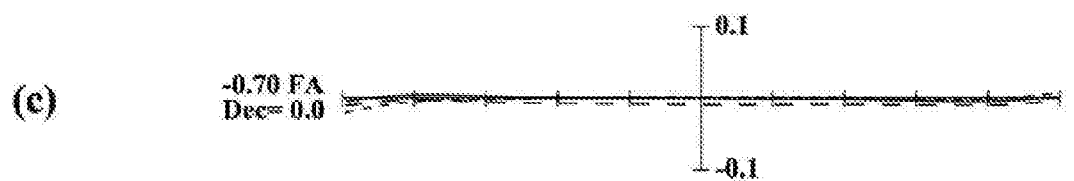
Figure 3A:
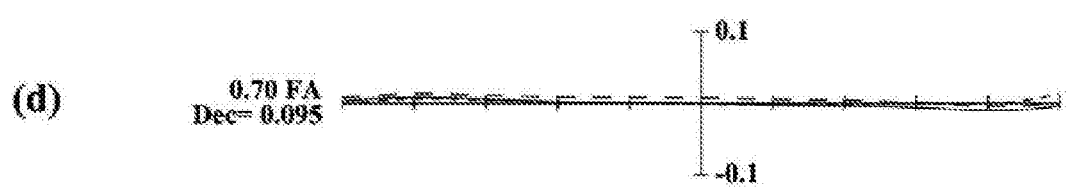
Figure 3A:
Figure 3A:
Figure 3A:
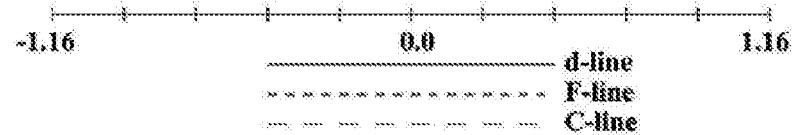
Figure 3B:
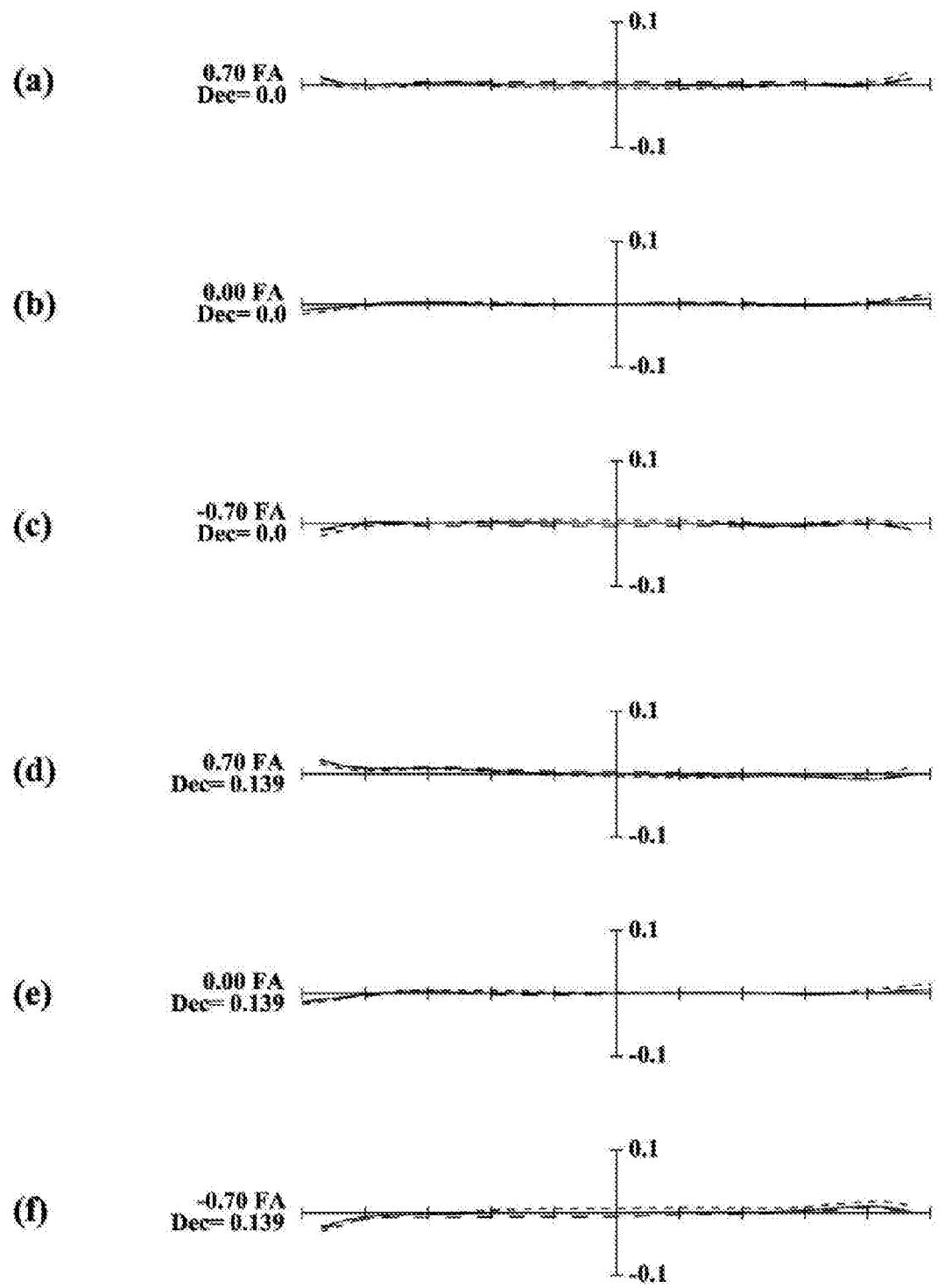
FIG. 3B illustrates lateral aberration diagrams showing the basic state (where the image blur is not compensated for) and image blur compensated states that the zoom lens system according to the example of numerical values assumes at an intermediate position.
Figure 3C:
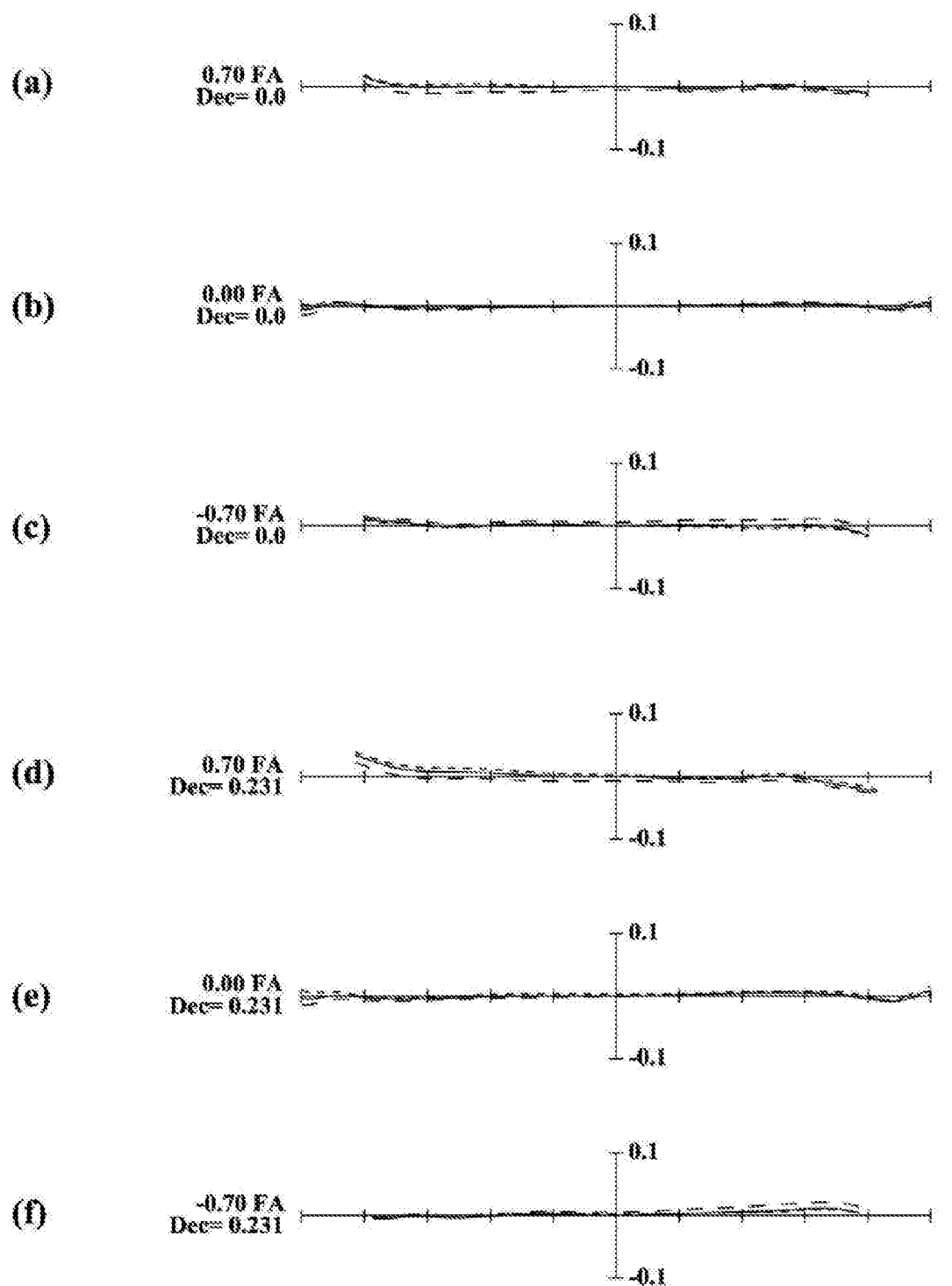
FIG. 3C illustrates lateral aberration diagrams showing the basic state (where the image blur is not compensated for) and image blur compensated states that the zoom lens system according to the example of numerical values assumes at telephoto end.
Figure 6A:
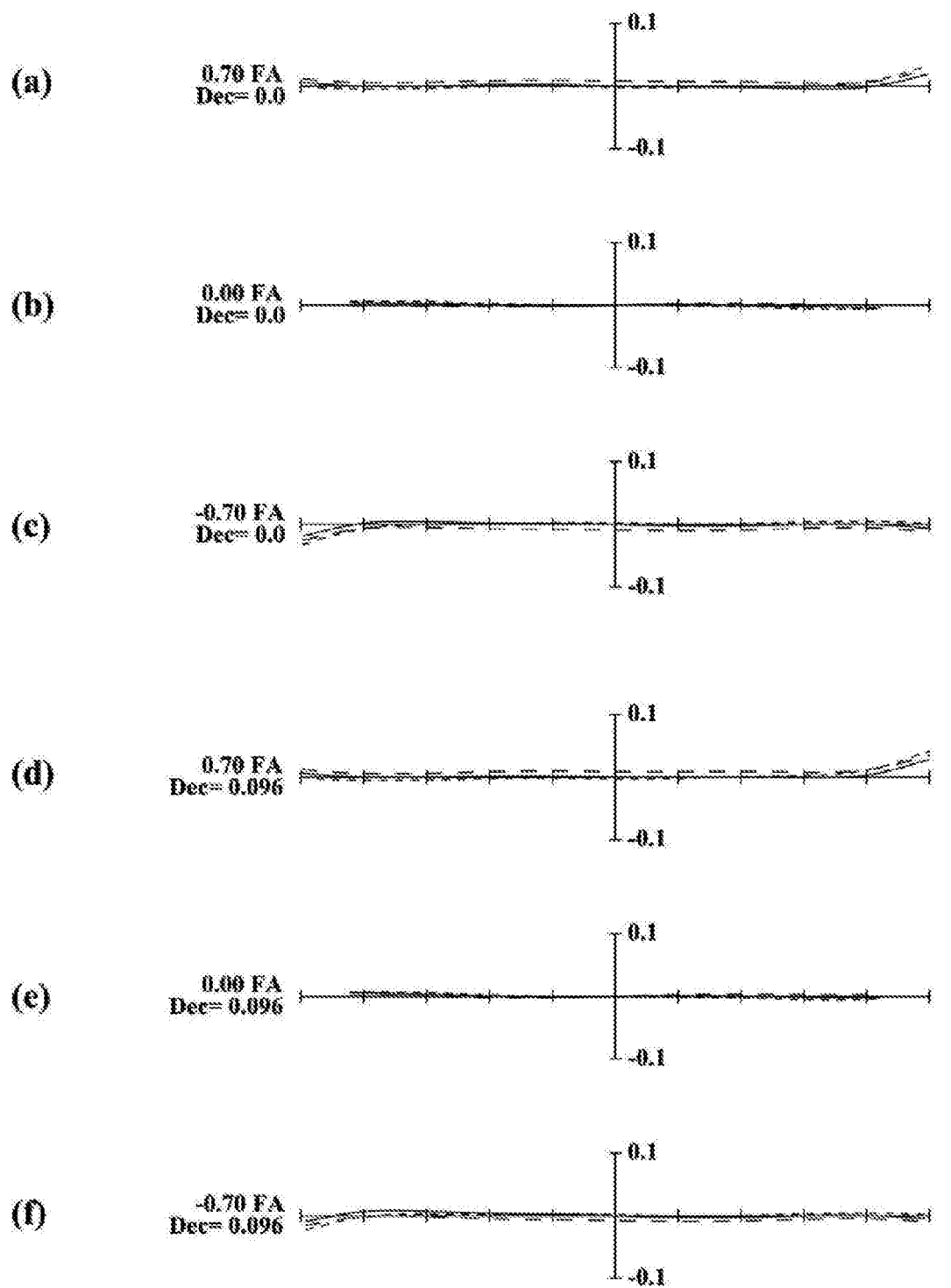
FIG. 6A illustrates lateral aberration diagrams showing a basic state (where the image blur is not compensated for) and image blur compensated states that the zoom lens system according to the example of numerical values assumes at wide-angle end.
Figure 6B:
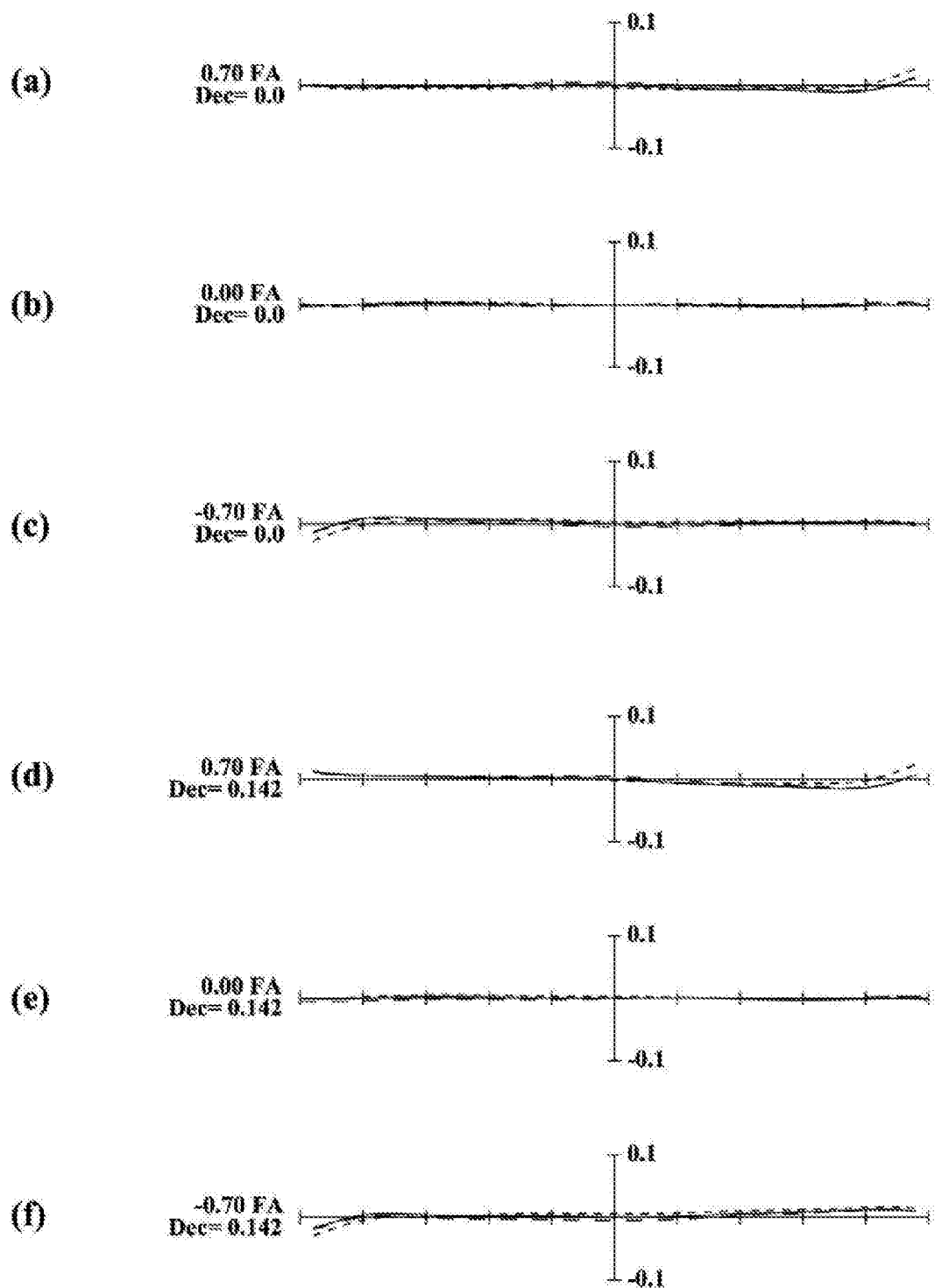
FIG. 6B illustrates lateral aberration diagrams showing the basic state (where the image blur is not compensated for) and image blur compensated states that the zoom lens system according to the example of numerical values assumes at an intermediate position.
Figure 6C:
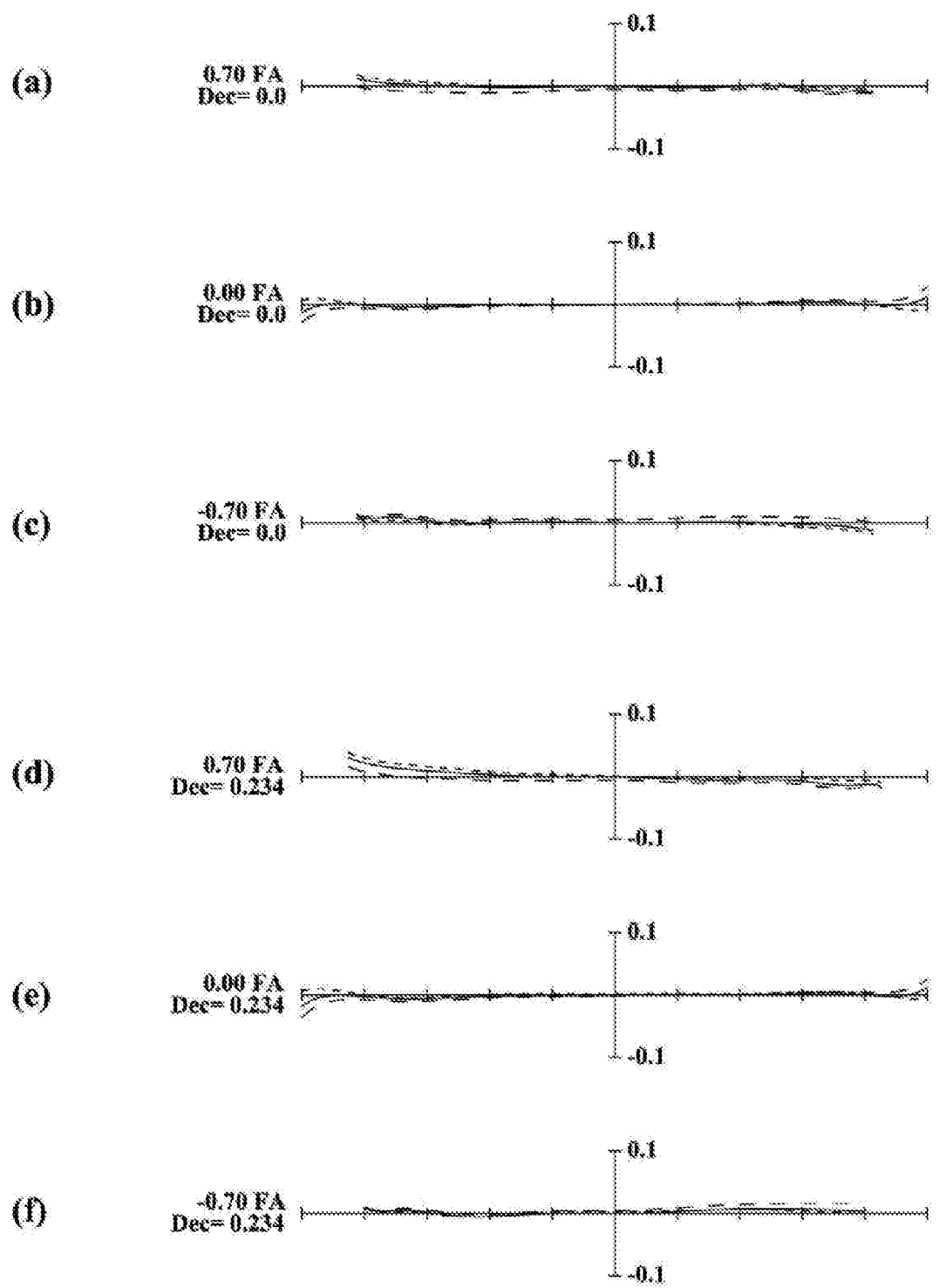
FIG. 6C illustrates lateral aberration diagrams showing the basic state (where the image blur is not compensated for) and image blur compensated states that the zoom lens system according to the example of numerical values assumes at telephoto end.
Figure 9A:
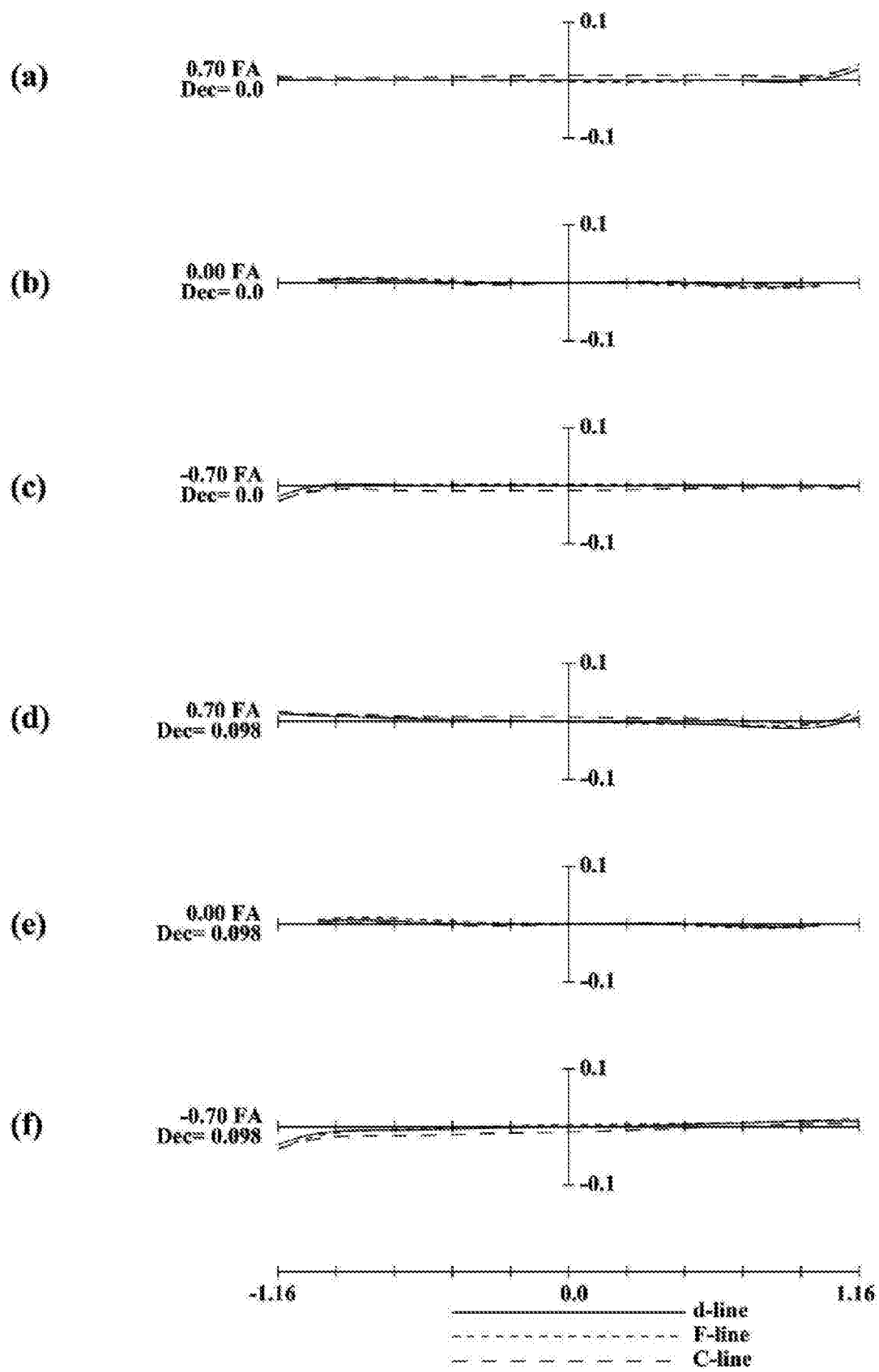
FIG. 9A illustrates lateral aberration diagrams showing a basic state (where the image blur is not compensated for) and image blur compensated states that the zoom lens system according to the example of numerical values assumes at wide-angle end.
Figure 9B:
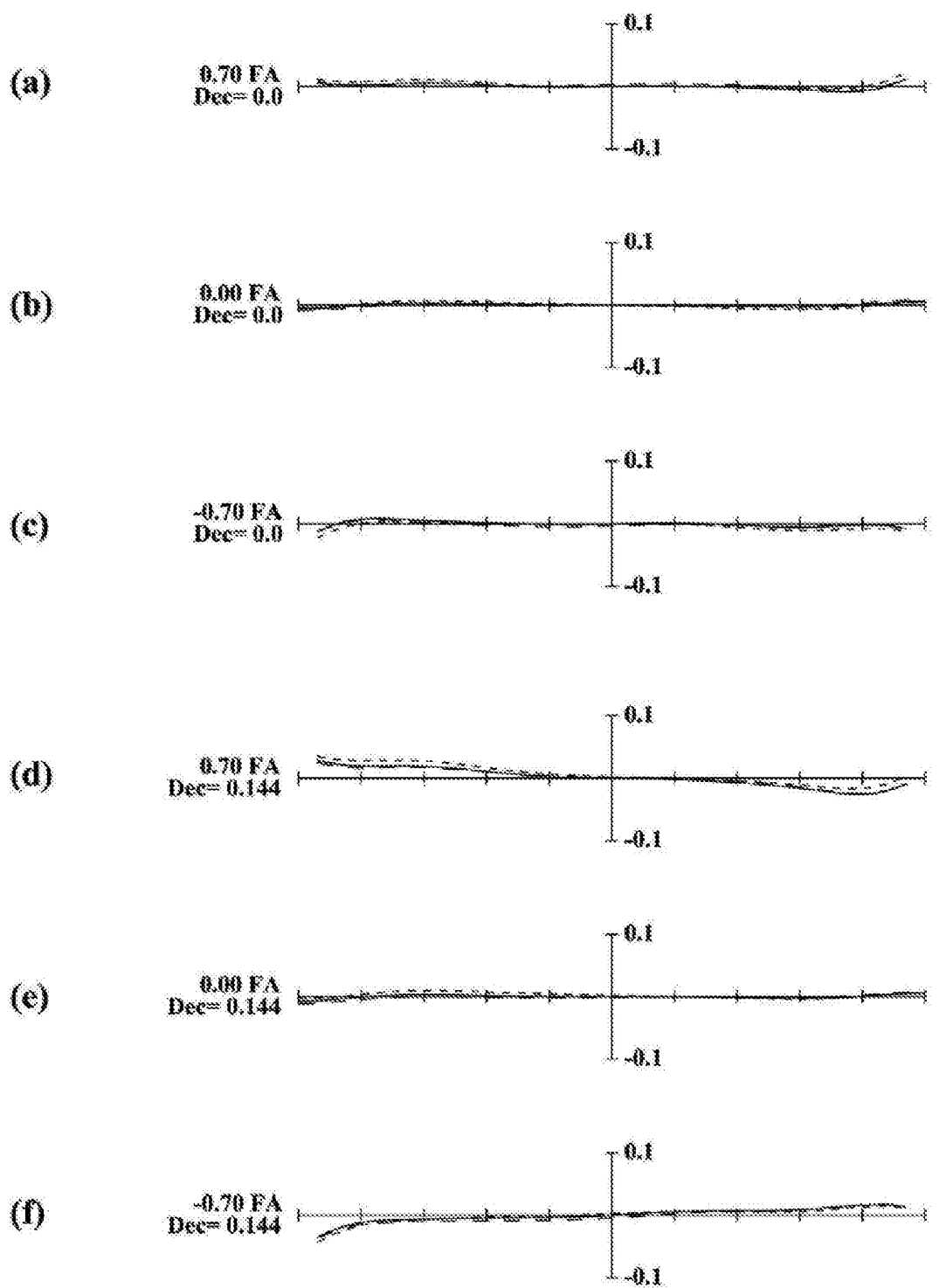
FIG. 9B illustrates lateral aberration diagrams showing the basic state (where the image blur is not compensated for) and image blur compensated states that the zoom lens system according to the example of numerical values assumes at an intermediate position.
Figure 9C:
FIG. 9C illustrates lateral aberration diagrams showing the basic state (where the image blur is not compensated for) and image blur compensated states that the zoom lens system according to the example of numerical values assumes at telephoto end.
Figure 9C:
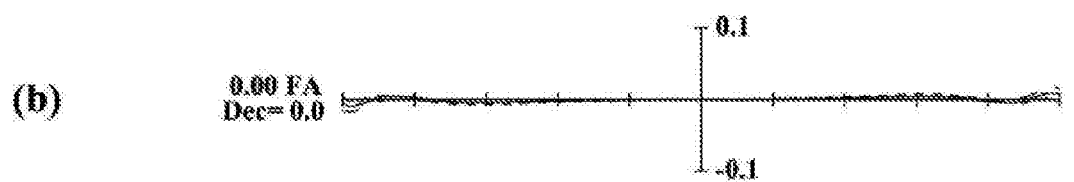
Figure 9C:
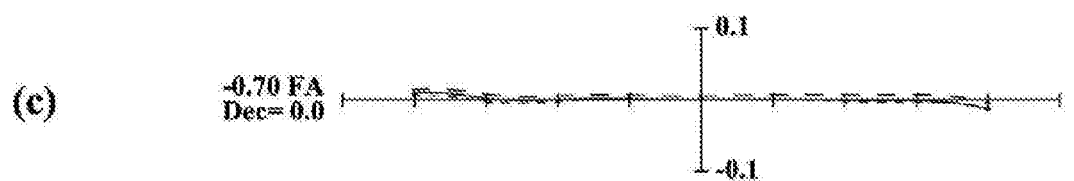
Figure 9C:
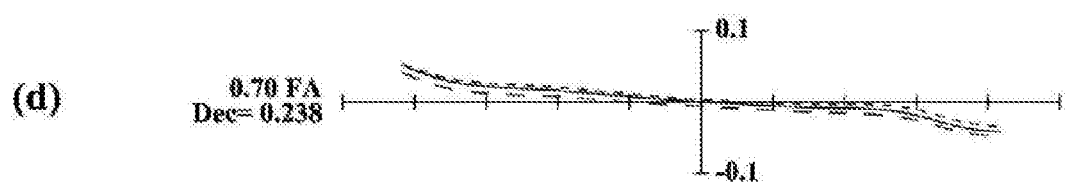
Figure 9C:
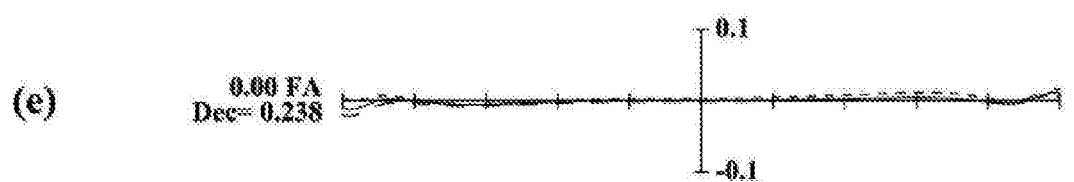
Figure 9C:
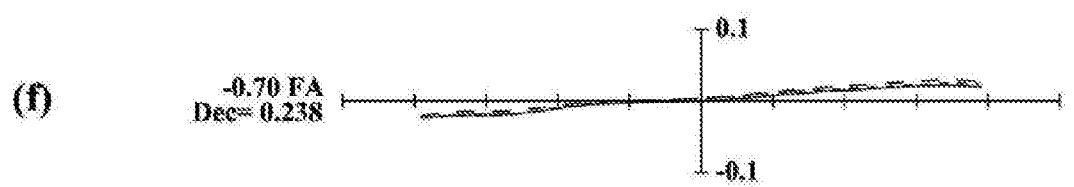
Figure 9C:
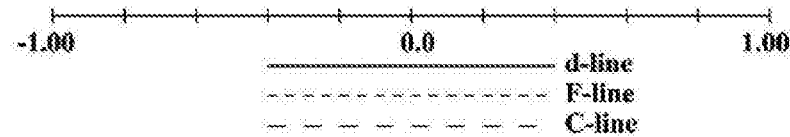

FIGS. 3A, 6A, and 9A are lateral aberration diagrams at the wide-angle end of the zoom lens systems according to the first, second, and third examples of numerical values corresponding to the first, second, and third embodiments, respectively. FIGS. 3B, 6B, and 9B are lateral aberration diagrams at the intermediate position of the zoom lens systems according to the first, second, and third examples of numerical values corresponding to the first, second, and third embodiments, respectively. FIGS. 3C, 6C, and 9C are lateral aberration diagrams at the telephoto end of the zoom lens systems according to the first, second, and third examples of numerical values corresponding to the first, second, and third embodiments, respectively.

In this case, portions (a), (b), and (c) of these lateral aberration diagrams show characteristics in a basic state where no image blur compensation is performed at any zoom position, while portions (d), (e), and (f) of these lateral aberration diagrams show characteristics in an image blur compensated state at the telephoto end where the group of image blur compensation lenses has been shifted to a predetermined extent perpendicularly to the optical axis.

In these lateral aberration diagrams showing the basic state, portion (a) shows a characteristic with respect to the lateral aberration at an image point where the image height is 70% of the maximum image height, portion (b) shows a characteristic with respect to the lateral aberration at an on-axis image point, and portion (c) shows a characteristic with respect to the lateral aberration at an image point where the image height is −70% of the maximum image height. Likewise, in these lateral aberration diagrams showing the image blur compensated state, portion (d) shows a characteristic with respect to the lateral aberration at the image point where the image height is 70% of the maximum image height, portion (e) shows a characteristic with respect to the lateral aberration at the on-axis image point, and portion (f) shows a characteristic with respect to the lateral aberration at the image point where the image height is −70% of the maximum image height.

In each lateral aberration diagram, the abscissa indicates the distance from a principal ray on the pupil, the solid curve indicates a characteristic in response to a d-line, the shorter dashed curve indicates a characteristic in response to an F-line, and the longer dashed curve indicates a characteristic in response to a C-line. Also, in each lateral aberration diagram, the meridional plane is supposed to be a plane including the optical axis of the thirteenth lens element L13 of the third group of lenses G3.

Following are the distances traveled by the group of image blur compensation lenses perpendicularly to the optical axis when the zoom lens systems according to the respective examples of numerical values are in the image blur compensated state at each zoom position.

|  | Wide | Middle | Tele |
| --- | --- | --- | --- |
| First example of numerical values | 0.095 mm | 0.139 mm | 0.231 mm |
| Second example of numerical values | 0.096 mm | 0.142 mm | 0.234 mm |
| Third example of numerical values | 0.098 mm | 0.144 mm | 0.238 mm |

Note that at each zoom position with an infinite shooting distance, the image eccentricity when the zoom lens system has a tilt angle of 0.3 degrees is equal to the image eccentricity when the group of image blur compensation lenses translates by each of these values perpendicularly to the optical axis.

As can be seen from the lateral aberration diagrams shown in respective portions (b) and (e) of FIGS. 3A-3C, FIGS. 6A-6C, and FIGS. 9A-9C, the lateral aberration has a good degree of symmetry at the on-axis image point in this state.

Also, comparing the lateral aberration at the image point where the image height is +70% of the maximum image height in the basic state shown in respective portions (a) of FIGS. 3A-3C, FIGS. 6A-6C, and FIGS. 9A-9C with the lateral aberration at the image point where the image height is −70% of the maximum image height in the basic state shown in respective portions (c) thereof, it can be seen that the degree of curvature is small and the aberration curves have almost the same gradient. Thus, it can be seen that the eccentric coma aberration and eccentric astigmatism are both insignificant. These results reveal that sufficiently good imaging performance is achieved even in the image blur compensated state.

Following are the distances dF to be traveled by the group of focus lenses while the zoom lens systems according to the respective examples of numerical values are focusing from the infinity focus point at the telephoto end to the close focus point:

First example of numerical values: 13.76 mm
Second example of numerical values: 13.67 mm
Third example of numerical values: 14.13 mm Note that at the closest focus point, the distance from the closest subject to the image plane is 30 cm, the zoom power for shooting in that state is 0.5×, and therefore, the zoom lens system according to each example of numerical values has excellent close-up shooting capability.

(First Example of Numerical Values)

Following is a first exemplary set of numerical values for the zoom lens system corresponding to the first embodiment shown in FIG. 1. Specifically, as the first example of numerical values, surface data is shown in Table 1, aspheric surface data is shown in Table 2, and various types of data at the infinity focus point are shown in Tables 3A-3C:

TABLE 1

(Surface data)

| Surface No. | r | d | nd | vd |
|---|---|---|---|---|
| (object surface ∞) | | | | |
| 1. | 280.00000 | 1.70000 | 1.92286 | 20.9 |
| 2. | 125.81440 | 0.00500 | 1.56732 | 42.8 |
| 3. | 125.81440 | 4.90000 | 1.72916 | 54.7 |
| 4. | −2000.00000 | 0.20000 | | |
| 5. | 62.08700 | 5.44000 | 1.72916 | 54.7 |
| 6. | 220.88670 | variable | | |
| 7. | 124.38640 | 1.20000 | 1.77250 | 49.6 |
| 8. | 16.21160 | 10.36000 | | |
| 9*. | −33.92900 | 1.20000 | 1.80755 | 40.9 |
| 10*. | −209.79700 | 1.22000 | | |
| 11. | 138.67440 | 3.33000 | 1.92119 | 24.0 |
| 12. | −43.17300 | 1.77000 | | |
| 13. | −24.43450 | 0.80000 | 1.77250 | 49.6 |
| 14. | −47.00000 | variable | | |
| 15 (aperture). | ∞ | 1.20000 | | |
| 16*. | 25.50000 | 4.55000 | 1.68820 | 31.1 |
| 17*. | 311.09460 | 0.70000 | | |
| 18. | 19.32130 | 0.90000 | 1.87070 | 40.7 |
| 19. | 13.60000 | 0.00500 | 1.56732 | 42.8 |
| 20. | 13.60000 | 4.34000 | 1.49700 | 81.6 |

TABLE 1-continued (Surface data)

| Surface No. | r | d | nd | vd |
|---|---|---|---|---|
| 21. | 24.19990 | 3.25000 | | |
| 22. | 84.57030 | 0.80000 | 1.84666 | 23.8 |
| 23. | 18.44190 | 0.00500 | 1.56732 | 42.8 |
| 24. | 18.44190 | 5.21000 | 1.43700 | 95.1 |
| 25. | −96.27630 | 0.50000 | | |
| 26*. | 30.23740 | 5.00000 | 1.55333 | 71.8 |
| 27*. | −50.73480 | variable | | |
| 28*. | −68.67570 | 1.47000 | 1.55333 | 71.8 |
| 29*. | 43.14080 | variable | | |
| 30. | −106.50520 | 1.00000 | 1.49700 | 81.6 |
| 31. | 1030.88420 | 0.20000 | | |
| 32. | 61.55450 | 3.72000 | 1.90043 | 37.4 |
| 33. | 449.39140 | variable | | |
| 34. | ∞ | 2.10000 | 1.51680 | 64.2 |
| 35. | ∞ | 2.70000 | | |
| (Image surface ∞) | | | | |

TABLE 2

(Aspheric surface data)

Ninth surface:

K = 0.00000E+00, A4 = 4.45022E−05,
A6 = −5.52511E−07, A8 = 3.75457E−09,
A10 = −1.55004E−11, A12 = 2.73712E−14

Tenth surface:

K = 0.00000E+00, A4 = 3.22285E−05,
A6 = −5.67377E−07, A8 = 3.84163E−09,
A10 = −1.61204E−11, A12 = 2.85010E−14

Sixteenth surface:

K = 0.00000E+00, A4 = −5.20686E−07,
A6 = 5.98614E−08, A8 = −1.43541E−09,
A10 = 1.04537E−11, A12 = −3.02756E−14

Seventeenth surface:

K = 0.00000E+00, A4 = 7.38509E−06,
A6 = 4.63019E−08, A8 = −1.39981E−09,
A10 = 1.04276E−11, A12 = −3.09412E−14

Twenty-sixth surface:

K = 0.00000E+00, A4 = 3.90077E−06,
A6 = −5.00465E−08, A8 = 1.45882E−09,
A10 = −1.62372E−11, A12 = 9.28054E−14

Twenty-seventh surface:

K = 0.00000E+00, A4 = 1.50035E−05,
A6 = −3.78157E−08, A8 = 1.43815E−09,
A10 = −1.72507E−11, A12 = 1.03537E−13

Twenty-eighth surface:

K = 1.35840E+01, A4 = 1.32500E−04,
A6 = −1.71126E−06, A8 = 1.83203E−08,
A10 = −1.24693E−10, A12 = 3.74570E−13

Twenty-ninth surface:

K = 1.27323E+00, A4 = 1.25914E−04,
A6 = −1.60049E−06, A8 = 1.58641E−08,
A10 = −1.01935E−10, A12 = 2.89438E−13

(Various Types of Data at Infinity Focus Point)

TABLE 3A (Various types of data)
Zoom ratio: 4.02233

| | Wide | Middle | Tele |
|---|---|---|---|
| Focal length: | 25.0078 | 50.1541 | 100.5897 |
| F number: | 4.12027 | 4.12016 | 4.12031 |
| Angle of view: | 40.9808 | 23.2685 | 12.0606 |
| Image height: | 19.6000 | 21.6330 | 21.6330 |
| Total lens length: | 136.5010 | 148.5300 | 180.7900 |
| Aperture radius (CIR): | 7.2700 | 9.1250 | 10.8930 |
| d6: | 0.7000 | 12.7290 | 32.9890 |
| d14: | 27.0720 | 8.8540 | 0.9570 |
| d27: | 1.8000 | 2.6200 | 1.8000 |
| d29: | 16.1250 | 14.5550 | 29.6400 |
| d33: | 21.0290 | 39.9970 | 45.6290 |

TABLE 3B (Data about group of zoom lenses)

| Group | Start surface | Focal Length |
|---|---|---|
| 1. | 1. | 93.99984 |
| 2. | 7. | −20.43647 |
| 3. | 15. | 27.10485 |
| 4. | 28. | −47.66198 |
| 5. | 30. | 132.20000 |

TABLE 3C (Zoom powers of group of zoom lenses)

| Group | Start Surface | Wide | Middle | Tele |
|---|---|---|---|---|
| 1. | 1 | 0.00000 | 0.00000 | 0.00000 |
| 2. | 7 | −0.30782 | −0.37594 | 0.59929 |
| 3. | 15 | 0.52274 | −0.77385 | −0.85522 |
| 4. | 28 | 2.07933 | 2.81435 | 3.42650 |
| 5. | 30 | 0.79514 | 0.65167 | 0.60935 |

(Second Example of Numerical Values)

Following is a second exemplary set of numerical values for the zoom lens system according to the second embodiment shown in FIG. 4. Specifically, as the second example of numerical values, surface data is shown in Table 4, aspheric surface data is shown in Table 5, and various types of data at the infinity focus point are shown in Tables 6A-6C:

TABLE 4

(Surface data)

| Surface No. | r | d | nd | vd |
|---|---|---|---|---|
| (object surface ∞) | | | | |
| 1. | 422.73930 | 1.70000 | 1.92286 | 20.9 |
| 2. | 150.55760 | 0.00500 | 1.56732 | 42.8 |
| 3. | 150.55760 | 4.73000 | 1.72916 | 54.7 |
| 4. | −707.32710 | 0.20000 | | |
| 5. | 62.46690 | 5.52000 | 1.72916 | 54.7 |
| 6. | 222.97240 | variable | | |
| 7. | 115.08850 | 1.20000 | 1.77250 | 49.6 |
| 8. | 16.32840 | 10.18000 | | |
| 9*. | −34.17180 | 1.20000 | 1.80998 | 40.9 |
| 10*. | −300.79420 | 0.54000 | | |
| 11. | 161.26780 | 3.43000 | 1.92119 | 24.0 |
| 12. | −39.93660 | 2.05000 | | |
| 13. | −22.03700 | 0.80000 | 1.77250 | 49.6 |
| 14. | −40.05520 | variable | | |

TABLE 4-continued (Surface data)

| Surface No. | r | d | nd | vd |
|---|---|---|---|---|
| 15. (aperture) | ∞ | 1.20000 | | |
| 16*. | 24.99290 | 6.00000 | 1.68948 | 31.0 |
| 17*. | 1000.00000 | 1.52000 | | |
| 18. | 41.05800 | 4.50000 | 1.49700 | 81.6 |
| 19. | 78.31140 | 1.46000 | | |
| 20. | 108.58390 | 0.80000 | 1.84666 | 23.8 |
| 21. | 16.32600 | 0.00500 | 1.56732 | 42.8 |
| 22. | 16.32600 | 5.50000 | 1.43700 | 95.1 |
| 23. | −256.60390 | 1.96000 | | |
| 24*. | 30.94220 | 5.00000 | 1.55332 | 71.7 |
| 25*. | −49.30730 | variable | | |
| 26*. | −85.39870 | 1.36000 | 1.55332 | 71.7 |
| 27*. | 37.00340 | variable | | |
| 28. | −89.83630 | 1.00000 | 1.49700 | 81.6 |
| 29. | 817.04480 | 0.20000 | | |
| 30. | 71.23630 | 4.00000 | 1.90043 | 37.4 |
| 31. | −582.43270 | variable | | |
| 32. | ∞ | 2.10000 | 1.51680 | 64.2 |
| 33. | ∞ | 2.70000 | | |
| (Image plane ∞) | | | | |

TABLE 5

(Aspheric Surface data)

Ninth surface:

K = 0.00000E+00, A4 = 2.69532E−05,
A6 = −3.73595E−07, A8 = 2.76250E−09,
A10 = −1.11253E−11, A12 = 1.82425E−14

Tenth surface:

K = 0.00000E+00, A4 = 1.43997E−05,
A6 = −3.81003E−07, A8 = 2.69625E−09,
A10 = −1.06521E−11, A12 = 1.50319E−14

Sixteenth surface:

K = 0.00000E+00, A4 = −9.67453E−07,
A6 = 1.56958E−08, A8 = −1.29190E−10,
A10 = 1.13972E−12, A12 = 1.69850E−15

Seventeenth surface:

K = 0.00000E+00, A4 = 8.16413E−06,
A6 = 1.44039E−08, A8 = −5.47160E−11,
A10 = 6.37084E−13, A12 = 4.97057E−15

Twenty-fourth surface:

K = 0.00000E+00, A4 = 1.77556E−06,
A6 = −5.77564E−08, A8 = 2.02504E−09,
A10 = −1.87715E−11, A12 = 8.65368E−14

Twenty-fifth surface:

K = 0.00000E+00, A4 = 1.39033E−05,
A6 = −4.15282E−08, A8 = 1.76890E−09,
A10 = −1.79381E−11, A12 = 9.12412E−14

Twenty-sixth surface:

K = 0.00000E+00, A4 = 1.14383E−04,
A6 = −1.71852E−06, A8 = 1.81738E−08,
A10 = −1.13888E−10, A12 = 3.06620E−13

Twenty-seventh surface:

K = −1.80088E+00, A4 = 1.20230E−04,
A6 = −1.65664E−06, A8 = 1.67089E−08,
A10 = −9.97466E−11, A12 = 2.55671E−13

(Various Types of Data at Infinity Focus Point)

TABLE 6A (Various types of data)
Zoom ratio: 4.02230

|  | Wide | Middle | Tele |
|---|---|---|---|
| Focal length: | 25.0080 | 50.1549 | 100.5896 |
| F number: | 4.12005 | 4.12037 | 4.12030 |
| Angle of view: | 41.0581 | 23.0757 | 11.9668 |
| Image height: | 19.6000 | 21.6330 | 21.6330 |
| Total lens length: | 136.5002 | 147.8181 | 183.0005 |
| Aperture radius (CIR): | 7.1700 | 8.8220 | 10.6300 |
| d6: | 0.7000 | 13.3986 | 34.0018 |
| d14: | 26.2754 | 8.0207 | 0.8000 |
| d25: | 1.8000 | 3.6078 | 1.8000 |
| d27: | 16.4767 | 13.9188 | 28.2903 |
| d31: | 21.0881 | 38.7122 | 47.9484 |
| d33: | 21.0290 | 39.9970 | 45.6290 |

TABLE 6B (Data about group of zoom lenses)

| Group | Start Surface | Focal length |
|---|---|---|
| 1. | 1. | 95.88508 |
| 2. | 7. | −20.14088 |
| 3. | 15. | 26.92776 |
| 4. | 26 | −46.47431 |
| 5. | 28 | 123.58272 |

TABLE 6C (Zoom powers of group of zoom lenses)

| Group | Start Surface | Wide | Middle | Tele |
|---|---|---|---|---|
| 1. | 1. | 0.00000 | 0.00000 | 0.00000 |
| 2. | 7. | −0.29422 | −0.36123 | −0.57293 |
| 3. | 15. | −0.53357 | −0.80232 | −0.87983 |
| 4. | 26. | 2.09588 | 2.77542 | 3.61667 |
| 5. | 28 | 0.79269 | 0.65029 | 0.57543 |

(Third Example of Numerical Values)

Following is a third exemplary set of numerical values for the zoom lens system according to the third embodiment shown in FIG. 7. Specifically, as the third example of numerical values, surface data is shown in Table 7, aspheric surface data is shown in Table 8, and various types of data at the infinity focus point are shown in Tables 9A-9C:

TABLE 7

(Surface data)

| Surface No. | r | d | nd | vd |
|---|---|---|---|---|
| (Object surface ∞) | | | | |
| 1. | 1004.63550 | 1.70000 | 1.92286 | 20.9 |
| 2. | 183.62200 | 0.00500 | 1.56732 | 42.8 |
| 3. | 183.62200 | 4.75000 | 1.69680 | 55.5 |
| 4. | −383.63440 | 0.20000 | | |
| 5. | 58.86300 | 5.50000 | 1.72916 | 54.7 |
| 6. | 178.89860 | variable | | |
| 7. | 91.57430 | 1.20000 | 1.80420 | 46.5 |
| 8. | 16.35910 | 10.33000 | | |
| 9*. | −33.54290 | 1.20000 | 1.80998 | 40.9 |
| 10*. | −306.91010 | 0.45000 | | |
| 11. | 142.12350 | 3.59000 | 1.92119 | 24.0 |
| 12. | −38.69550 | 2.22000 | | |
| 13. | −21.53810 | 0.80000 | 1.77250 | 49.6 |

TABLE 7-continued (Surface data)

| Surface No. | r | d | nd | vd |
|---|---|---|---|---|
| 14. | −40.87560 | variable | | |
| 15 (aperture). | ∞ | 1.20000 | | |
| 16*. | 24.93270 | 4.71000 | 1.68948 | 31.0 |
| 17*. | 508.06520 | 0.70000 | | |
| 18. | 23.31940 | 0.80000 | 1.90043 | 37.4 |
| 19. | 14.93240 | 0.00500 | 1.56732 | 42.8 |
| 20. | 14.93240 | 4.24000 | 1.49700 | 81.6 |
| 21. | 30.84710 | 2.80000 | | |
| 22. | 102.30240 | 0.80000 | 1.84666 | 23.8 |
| 23. | 22.13730 | 0.00500 | 1.56732 | 42.8 |
| 24. | 22.13730 | 5.04000 | 1.43700 | 95.1 |
| 25. | −71.94940 | 0.50000 | | |
| 26*. | 37.81550 | 5.00000 | 1.55332 | 71.7 |
| 27*. | −43.56910 | variable | | |
| 28*. | −37.84710 | 1.70000 | 1.55332 | 71.7 |
| 29*. | 122.05780 | variable | | |
| 30. | −158.87050 | 1.00000 | 1.49700 | 81.6 |
| 31. | 194.40880 | 0.20000 | | |
| 32. | 66.10340 | 4.30000 | 1.80420 | 46.5 |
| 33. | −246.57380 | variable | | |
| 34. | 78.20370 | 1.99000 | 1.77250 | 49.6 |
| 35. | 47.85280 | 25.84580 | | |
| 36. | ∞ | 2.10000 | 1.51680 | 64.2 |
| 37. | ∞ | 2.70000 | | |
| (Image plane ∞) | | | | |

TABLE 8

(Aspheric surface data)
Aspheric surface data

Ninth surface:

$K = 0.00000E+00$, $A4 = 2.32315E−05$,
$A6 = −3.37863E−07$, $A8 = 2.18933E−09$,
$A10 = −7.01934E−12$, $A12 = 7.60236E−15$

Tenth surface:

$K = 0.00000E+00$, $A4 = 1.15681E−05$,
$A6 = −3.58452E−07$, $A8 = 2.28866E−09$,
$A10 = −7.58087E−12$, $A12 = 6.85474E−15$

Sixteenth surface:

$K = 0.00000E+00$, $A4 = −1.04771E−06$,
$A6 = 7.04803E−09$, $A8 = −7.58732E−10$,
$A10 = 6.81334E−12$, $A12 = −2.20565E−14$

Seventeenth surface:

$K = 0.00000E+00$, $A4 = 8.63991E−06$,
$A6 = −8.49560E−09$, $A8 = −6.46958E−10$,
$A10 = 6.39102E−12$, $A12 = −2.20979E−14$

Twenty-sixth surface:

$K = 0.00000E+00$, $A4 = 3.03249E−06$,
$A6 = −1.33006E−07$, $A8 = 1.28235E−09$,
$A10 = −5.92143E−12$, $A12 = 1.92132E−14$

Twenty-seventh surface:

$K = 0.00000E+00$, $A4 = 1.41749E−05$,
$A6 = −1.59357E−07$, $A8 = 1.77776E−09$,
$A10 = −9.66265E−12$, $A12 = 2.96529E−14$

Twenty-eighth surface:

$K = 0.00000E+00$, $A4 = 1.91657E−04$,
$A6 = −1.98650E−06$, $A8 = 1.65439E−08$,
$A10 = −9.21681E−11$, $A12 = 2.35813E−13$

Twenty-ninth surface:

$K = 0.00000E+00$, $A4 = 1.87235E−04$,
$A6 = −1.74227E−06$, $A8 = 1.29550E−08$,
$A10 = −6.67221E−11$, $A12 = 1.63826E−13$ (Various Types of Data at Infinity Focus Point)

TABLE 9A (Various types of data)
Zoom ratio: 4.02226

| | Wide | Middle | Tele |
|---|---|---|---|
| Focal length: | 25.0079 | 50.1546 | 100.5881 |
| F number: | 4.12001 | 4.12005 | 4.11995 |
| Angle of view: | 40.7564 | 22.7345 | 11.8347 |
| Image height: | 19.6000 | 21.6330 | 21.6330 |
| Total lens length: | 136.5005 | 145.0060 | 183.0009 |
| Aperture radius (CIR): | 7.3100 | 9.0270 | 10.8600 |
| d6: | 0.7000 | 12.5433 | 35.3270 |
| d14: | 26.6697 | 7.4430 | 0.8000 |
| d27: | 1.8000 | 4.0173 | 1.8000 |
| d29: | 10.4500 | 10.7717 | 28.8883 |
| d33: | 0.7000 | 14.0499 | 20.0048 |

TABLE 9B (Data about group of zoom lenses)

| Group | Start Surface | Focal length |
|---|---|---|
| 1. | 1. | 100.05399 |
| 2. | 7. | −20.08381 |
| 3. | 15. | 26.66326 |
| 4. | 28. | −52.01387 |
| 5. | 30 | 102.70855 |
| 6. | 34 | −164.30676 |

TABLE 9C (Zoom powers of group of zoom lenses)

| Group | Start Surface | Wide | Middle | Tele |
|---|---|---|---|---|
| 1. | 1. | 0.00000 | 0.00000 | 0.00000 |
| 2. | 7. | −0.27642 | −0.33025 | −0.52809 |
| 3. | 15 | −0.53591 | −0.84357 | −0.92138 |
| 4. | 28. | 1.99350 | 2.58700 | 3.28915 |
| 5. | 30. | 0.72786 | 0.59833 | 0.54039 |
| 6. | 34. | 1.16285 | 1.16247 | 1.16244 |

(Values Corresponding to Respective Conditions)

As described above, the zoom lens systems according to the first, second, and third embodiments were implemented using these first, second, and third exemplary sets of numerical values, respectively.

The following Table 10 summarizes respective values corresponding to the conditions expressed by the Inequalities (1) to (5) in respective examples of numerical values:

TABLE 10

(Values corresponding to conditions)

| Condition | 1$^{st}$ example of numerical values | 2$^{nd}$ example of numerical values | 3$^{rd}$ example of numerical values |
|---|---|---|---|
| (1) | 0.182 | 0.172 | 0.177 |
| (2) | 0.142 | 0.144 | 0.102 |
| (3) | 81.60 | 81.60 | 81.60 |
| (4) | 0.474 | 0.462 | 0.517 |
| (5) | 0.137 | 0.136 | 0.140 |

As can be seen from Table 10, the zoom lens systems implemented with the first, second, and third exemplary sets of numerical values satisfy the conditions expressed by the Inequalities (1) to (5).

Thus, the present disclosure provides a zoom lens system, which is small in size, has a maximum aperture of 4.15 or less (which would increase the brightness of the image shot) in the entire zoom range, and also has excellent imaging performance, and also provides an image capture device and camera system including such a zoom lens system.

Note that the embodiments and their variations described above are only examples of the present disclosure and should not be construed as limiting. Rather, each of those embodiments and variations may be readily modified, replaced, combined with other embodiments, or partially omitted in various manners without departing from the scope of the appended claims and their equivalents.

INDUSTRIAL APPLICABILITY

The zoom lens system according to the present disclosure is applicable to various types of cameras including digital still cameras, digital cameras, of which the lens is interchangeable, digital camcorders, cameras for cellphones and smartphones, and cameras for personal digital assistants (PDAs), surveillance cameras for surveillance systems, Web cameras, and onboard cameras. Among other things, the present disclosure is particularly suitably applicable as a zoom lens system for digital camera systems, digital camcorder systems, and other camera systems that require high image quality.

The invention claimed is:

1. A zoom lens system comprising:
   a first group of lenses having positive power;
   a second group of lenses having negative power;
   a third group of lenses having positive power;
   a fourth group of lenses having negative power; and
   a fifth group of lenses having power,
   the first, second, third, fourth, and fifth groups of lenses being arranged in this order such that the first group of lenses is located closer to an object than any other group of lenses and that the fifth group of lenses is located closer to an image than any other group of lenses, wherein
   while the zoom lens system is zooming, intervals between the respective groups of lenses change and the fifth group of lenses moves toward the object, and the zoom lens system satisfies the following Inequality (1):

$$0.12 < T35t/TLt < 0.25 \quad (1)$$

where T35t is a distance, measured at telephoto end, from one surface, located closest to the image, of the third group of lenses to another surface, located closest to the object, of the fifth group of lenses, and TLt is a distance, measured at the telephoto end, from one surface, located closest to the object, of the first group of lenses to an image plane, wherein
   a lens element LG5F, located closer to the object than any other one of multiple lens elements that form the fifth group of lenses, has negative power, and satisfies the following Inequality (3):

$$vdLG5F > 65 \quad (3)$$

where vdLG5F is an abbe number of the lens element LG5F.

2. The zoom lens system of claim 1, wherein
   the zoom lens system satisfies the following Inequality (2):

$$0.05 < T35w/TLw < 0.2 \quad (2)$$

where T35w is a distance, measured at wide-angle end, from the surface, located closest to the image, of the third group of lenses to the surface, located closest to the object, of the fifth group of lenses, and TLw is a distance, measured at the wide-angle end, from the surface, located closest to the object, of the first group of lenses to the image plane.

3. A camera system comprising:
an interchangeable lens unit including the zoom lens system of claim 2; and
a camera body configured to be connected removably to the interchangeable lens unit via a camera mount and including an image sensor configured to receive an optical image formed by the zoom lens system and transform the optical image into an electrical image signal,
the interchangeable lens unit forming the optical image on the image sensor.

4. An image capture device configured to transform an optical image of an object into an electrical image signal and display and/or store the image signal transformed, the image capture device comprising:
the zoom lens system of claim 2 configured to form the optical image of the object; and
an image sensor configured to transform the optical image formed by the zoom lens system into the electrical image signal.

5. The zoom lens system of claim 1, wherein
the zoom lens system satisfies the following Inequality (4):

$$0.3<|f4|/ft<0.7 \qquad (4)$$

where f4 is a focal length of the fourth group of lenses and ft is a focal length of the entire zoom lens system at the telephoto end.

6. A camera system comprising:
an interchangeable lens unit including the zoom lens system of claim 5; and
a camera body configured to be connected removably to the interchangeable lens unit via a camera mount and including an image sensor configured to receive an optical image formed by the zoom lens system and transform the optical image into an electrical image signal,
the interchangeable lens unit forming the optical image on the image sensor.

7. An image capture device configured to transform an optical image of an object into an electrical image signal and display and/or store the image signal transformed, the image capture device comprising:
the zoom lens system of claim 5 configured to form the optical image of the object; and
an image sensor configured to transform the optical image formed by the zoom lens system into the electrical image signal.

8. The zoom lens system of claim 1, wherein
the third group of lenses includes multiple lens elements, and
at least three of the multiple lens elements that form the third group of lenses have an abbe number greater than 65.

9. A camera system comprising:
an interchangeable lens unit including the zoom lens system of claim 8; and
a camera body configured to be connected removably to the interchangeable lens unit via a camera mount and including an image sensor configured to receive an optical image formed by the zoom lens system and transform the optical image into an electrical image signal,
the interchangeable lens unit forming the optical image on the image sensor.

10. An image capture device configured to transform an optical image of an object into an electrical image signal and display and/or store the image signal transformed, the image capture device comprising:
the zoom lens system of claim 8 configured to form the optical image of the object; and
an image sensor configured to transform the optical image formed by the zoom lens system into the electrical image signal.

11. The zoom lens system of claim 1, wherein
a group of lenses having negative power and disposed closer to an image focusing side than an aperture stop among all groups of lenses is set as a group of focus lenses, and
the zoom lens system satisfies the following Inequality (5):

$$0.05<|dF|/ft<0.3 \qquad (5)$$

where ft is a focal length of the entire zoom lens system at the telephoto end and dF is a distance traveled by the group a group of focus lenses while focusing from an infinity focus point at the telephoto end toward a closest focus point.

12. A camera system comprising:
an interchangeable lens unit including the zoom lens system of claim 11; and
a camera body configured to be connected removably to the interchangeable lens unit via a camera mount and including an image sensor configured to receive an optical image formed by the zoom lens system and transform the optical image into an electrical image signal,
the interchangeable lens unit forming the optical image on the image sensor.

13. An image capture device configured to transform an optical image of an object into an electrical image signal and display and/or store the image signal transformed, the image capture device comprising:
the zoom lens system of claim 11 configured to form the optical image of the object; and
an image sensor configured to transform the optical image formed by the zoom lens system into the electrical image signal.

14. A camera system comprising:
an interchangeable lens unit including the zoom lens system of claim 1; and
a camera body configured to be connected removably to the interchangeable lens unit via a camera mount and including an image sensor configured to receive an optical image formed by the zoom lens system and transform the optical image into an electrical image signal,
the interchangeable lens unit forming the optical image on the image sensor.

15. An image capture device configured to transform an optical image of an object into an electrical image signal and display and/or store the image signal transformed, the image capture device comprising:
the zoom lens system of claim 1 configured to form the optical image of the object; and
an image sensor configured to transform the optical image formed by the zoom lens system into the electrical image signal.

16. A zoom lens system comprising:
a first group of lenses having positive power;
a second group of lenses having negative power;

a third group of lenses having positive power;
a fourth group of lenses having negative power; and
a fifth group of lenses having power,
the first, second, third, fourth, and fifth groups of lenses being arranged in this order such that the first group of lenses is located closer to an object than any other group of lenses and that the fifth group of lenses is located closer to an image than any other group of lenses, wherein while the zoom lens system is zooming, intervals between the respective groups of lenses change and the fifth group of lenses moves toward the object, and the zoom lens system satisfies the following Inequality (1):

$$0.12 < T35t/TLt < 0.25 \qquad (1)$$

where T35t is a distance, measured at telephoto end, from one surface, located closest to the image, of the third group of lenses to another surface, located closest to the object, of the fifth group of lenses, and TLt is a distance, measured at the telephoto end, from one surface, located closest to the object, of the first group of lenses to an image plane, wherein the third group of lenses includes multiple lens elements, and
at least three of the multiple lens elements that form the third group of lenses have an abbe number greater than 65.

17. The zoom lens system of claim 16, wherein
the zoom lens system satisfies the following Inequality (2):

$$0.05 < T35w/TLw < 0.2 \qquad (2)$$

where T35w is a distance, measured at wide-angle end, from the surface, located closest to the image, of the third group of lenses to the surface, located closest to the object, of the fifth group of lenses, and TLw is a distance, measured at the wide-angle end, from the surface, located closest to the object, of the first group of lenses to the image plane.

18. The zoom lens system of claim 16, wherein
the zoom lens system satisfies the following Inequality (4):

$$0.3 < |f4|/ft < 0.7 \qquad (4)$$

where f4 is a focal length of the fourth group of lenses and ft is a focal length of the entire zoom lens system at the telephoto end.

19. The zoom lens system of claim 16, wherein
a group of lenses having negative power and disposed closer to an image focusing side than an aperture stop among all groups of lenses is set as a group of focus lenses, and
the zoom lens system satisfies the following Inequality (5):

$$0.05 < |dF|/ft < 0.3 \qquad (5)$$

where ft is a focal length of the entire zoom lens system at the telephoto end and dF is a distance traveled by the group of focus lenses while focusing from an infinity focus point at the telephoto end toward a closest focus point.

20. A camera system comprising:
an interchangeable lens unit including the zoom lens system of claim 16; and
a camera body configured to be connected removably to the interchangeable lens unit via a camera mount and including an image sensor configured to receive an optical image formed by the zoom lens system and transform the optical image into an electrical image signal,
the interchangeable lens unit forming the optical image on the image sensor.

* * * * *